(12) United States Patent
Mizuno

(10) Patent No.: US 11,113,946 B1
(45) Date of Patent: Sep. 7, 2021

(54) METHOD AND SYSTEM FOR DETERMINING CORRESPONDENCE RELATIONSHIP BETWEEN SENSING TARGET AND SENSOR

(71) Applicant: Hitachi, Ltd., Tokyo (JP)

(72) Inventor: Jun Mizuno, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/182,118

(22) Filed: Feb. 22, 2021

(30) Foreign Application Priority Data

May 28, 2020 (JP) .............................. JP2020-092841

(51) Int. Cl.
  *G08B 21/00* (2006.01)
  *G08B 21/18* (2006.01)
(52) U.S. Cl.
  CPC .................................. *G08B 21/182* (2013.01)
(58) Field of Classification Search
  CPC .................................................. G08B 21/182
  See application file for complete search history.

(56) References Cited

U.S. PATENT DOCUMENTS

| | | | | |
|---|---|---|---|---|
| 4,503,808 A | * | 3/1985 | McAlister | A61D 17/002 600/551 |
| 10,803,728 B1 | * | 10/2020 | Allen | G08B 21/0277 |
| 2019/0333233 A1 | * | 10/2019 | Hu | A61B 5/0077 |

FOREIGN PATENT DOCUMENTS

| JP | 2012-29027 A | 2/2012 |
|---|---|---|
| JP | 2019-100708 A | 6/2019 |

* cited by examiner

*Primary Examiner* — Ojiako K Nwugo
(74) *Attorney, Agent, or Firm* — Procopio, Cory, Hargreaves & Savitch LLP

(57) ABSTRACT

A method for determining a correspondence relationship between a sensing target and a sensor is a correspondence relationship determination method for determining whether or not a correspondence relationship between a sensing target and a sensor attached to the sensing target is correct. The method includes acquiring position information of a first sensor fixed and attached to the sensing target, acquiring position information of a second sensor detachably attached to the sensing target, and obtaining a distance by comparing the position information of the first sensor and the position information of the second sensor, and determining that the correspondence relationship between the sensing target and the second sensor indicates discrepancy when the distance is equal to or more than a threshold value.

15 Claims, 23 Drawing Sheets

FIG. 3
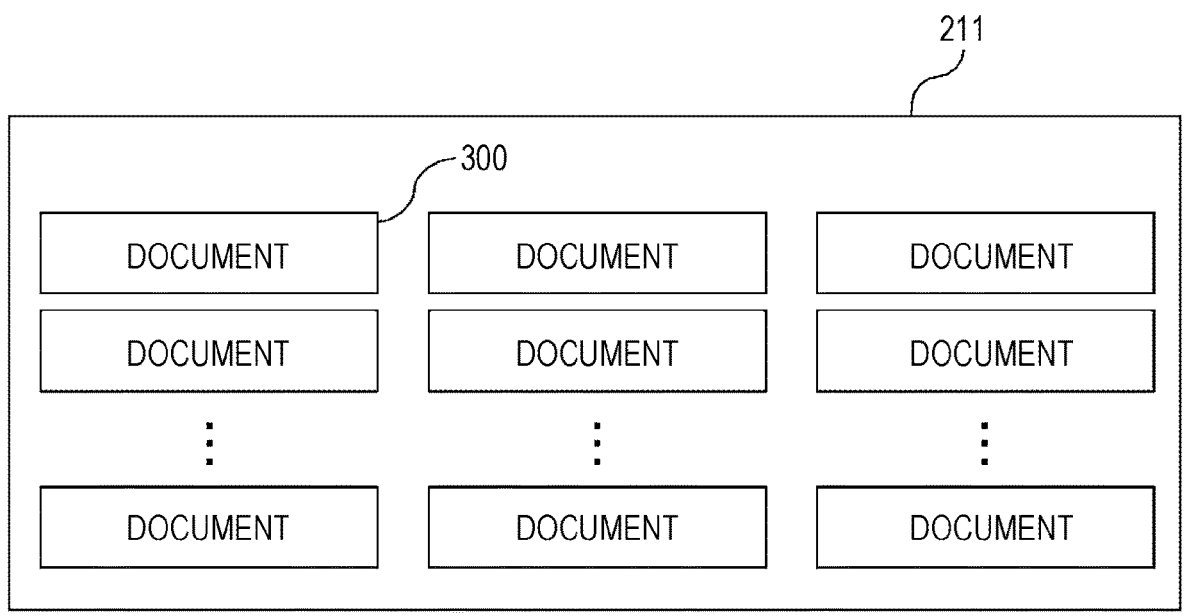
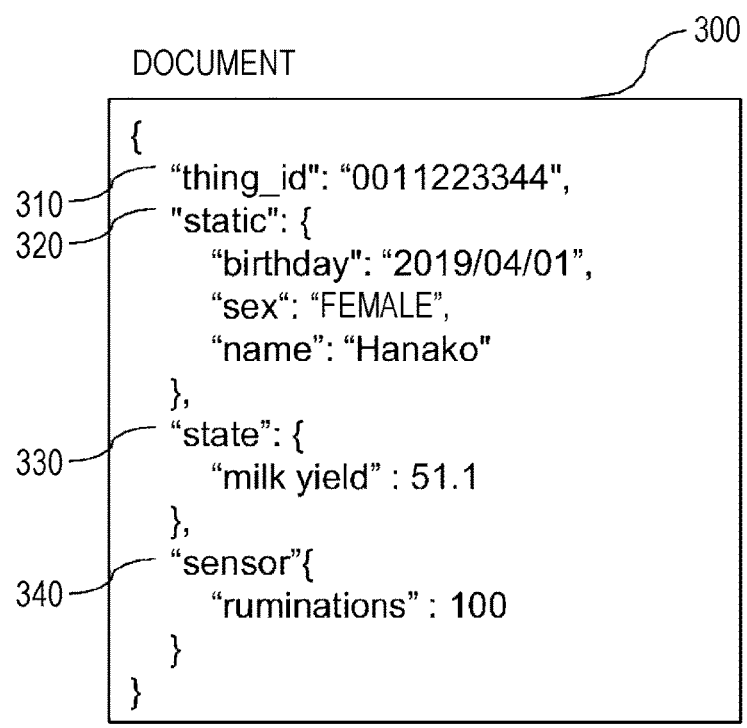

FIG. 4
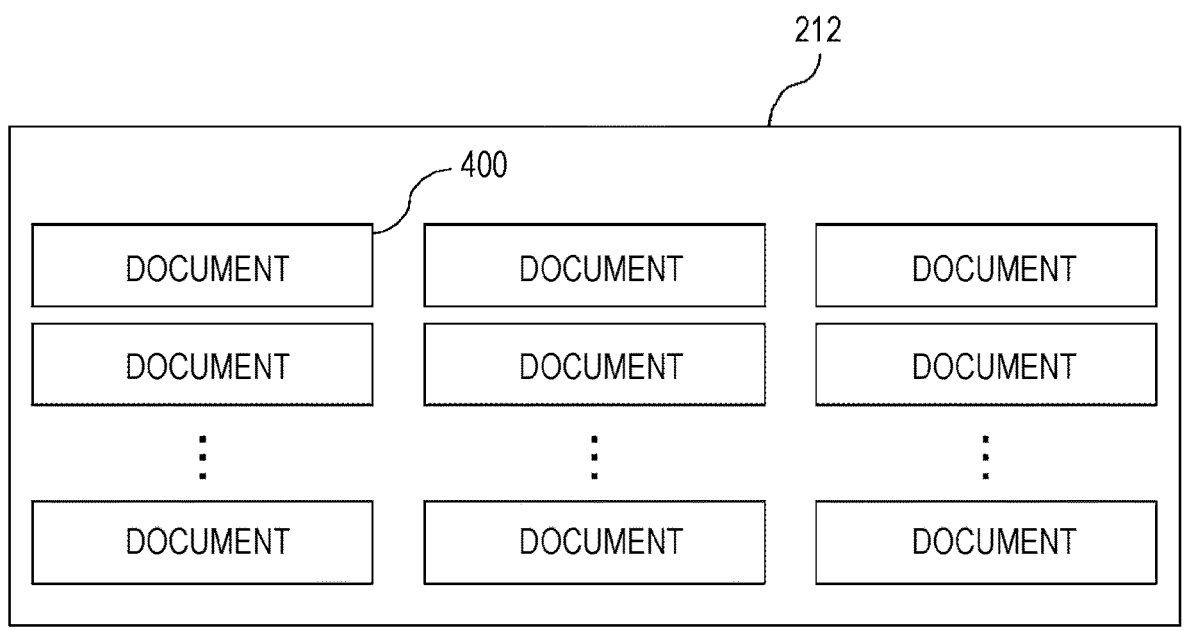
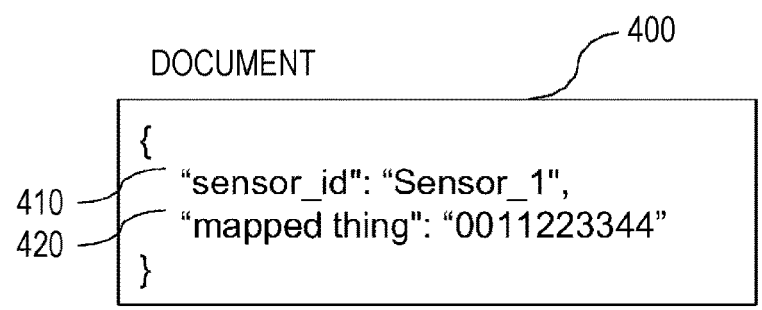

FIG. 11
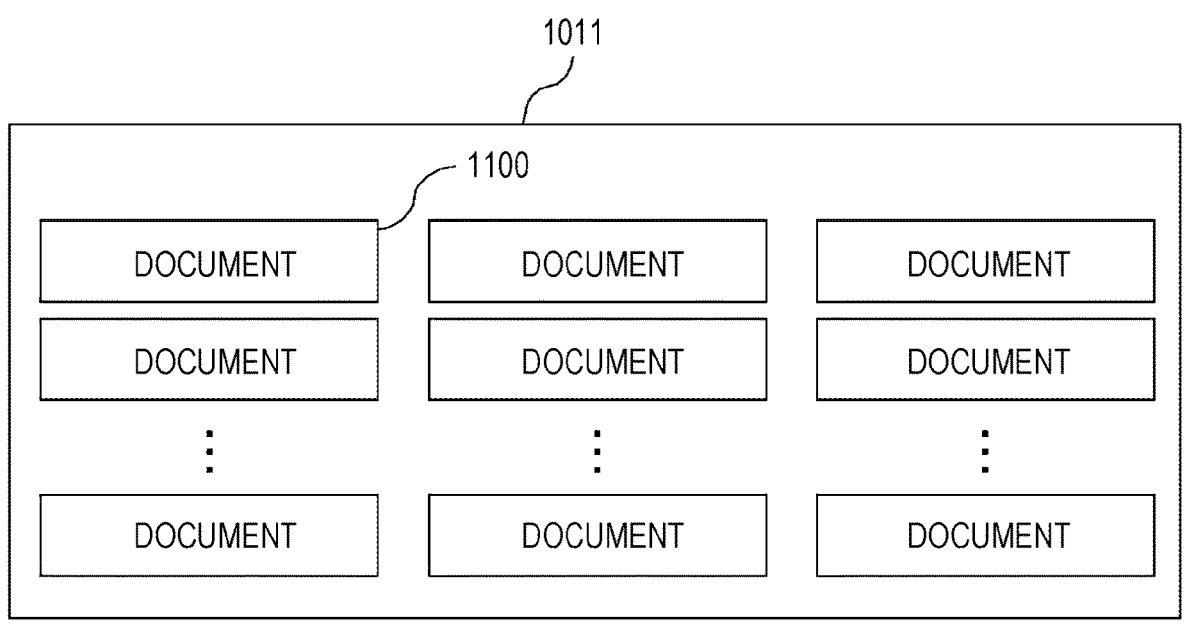
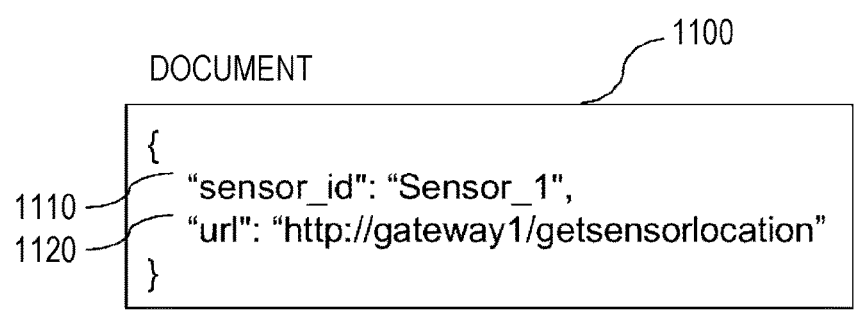

FIG. 12
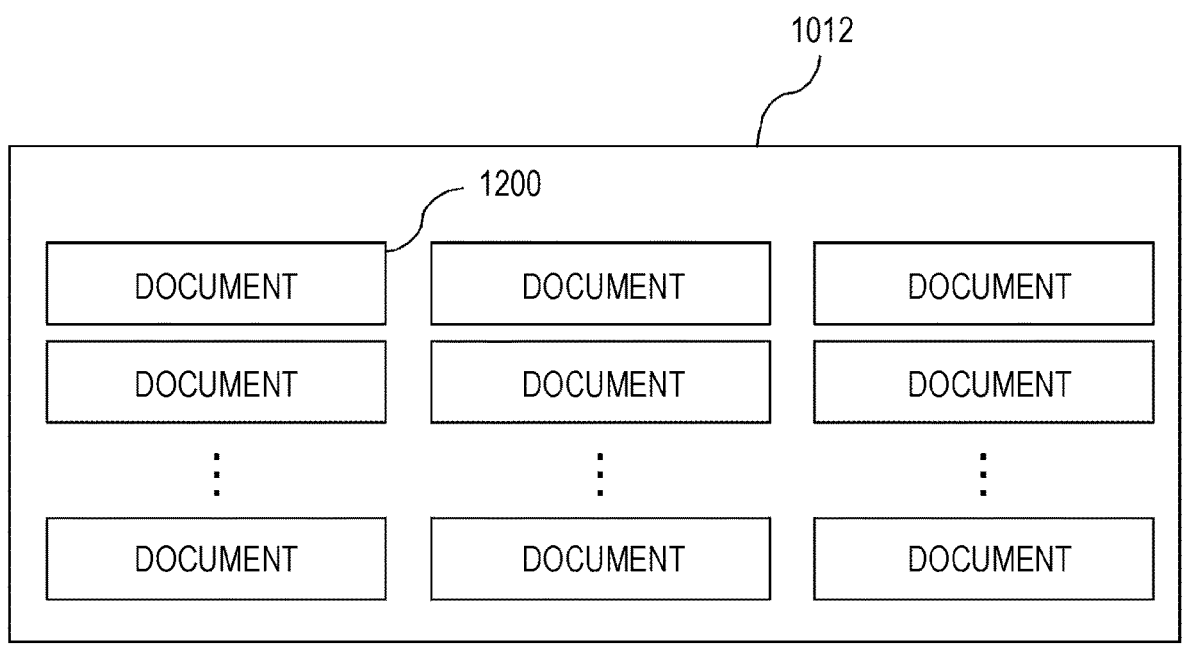

FIG. 15

| sensor_id 1501 | status 1502 | mapped_thing 1503 | mapping_status 1504 |
|---|---|---|---|
| Sensor_1 | OK | Taro | OK |
| Sensor_2 | OK | Hanako | NG |
| Sensor_3 | NG | Beko | NG |
| ... | ... | ... | ... |

FIG. 21
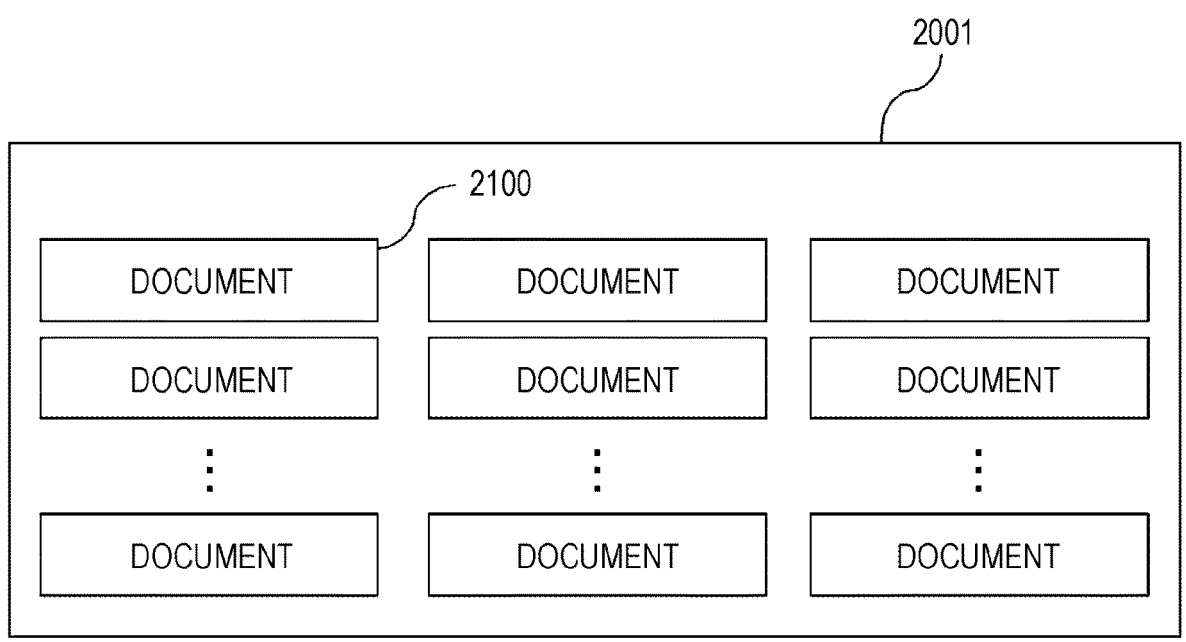

METHOD AND SYSTEM FOR DETERMINING CORRESPONDENCE RELATIONSHIP BETWEEN SENSING TARGET AND SENSOR

BACKGROUND OF THE INVENTION

1. Field of the Invention

The present invention relates to a technique for determining a correspondence relationship between a sensing target and a sensor attached to the sensing target.

2. Description of the Related Art

There is a mechanism called IoT (Internet of Things) in which "things" such as sensors and devices are connected to a cloud or a server via the Internet and are mutually controlled by exchanging information. In IoT systems, device operation management such as life/death monitoring and status monitoring of sensors and devices, setting changes and firmware updates is required.

When there is a discrepancy in the relationship between the sensor and the sensing target, there is a problem that the sensor data is not obtained by sensing the correct sensing target. Therefore, there is a need to grasp the correspondence relationship between the sensor and a thing as the sensing target by device management in addition to the device management in the related art. For example, in the livestock IoT, a cow management system that attaches a wearable sensor to a cow to manage the health condition of the cow is adopted. Here, in a case where a mistake occurs when the wearable sensor is attached, sensor data for measuring a different head of cow is managed, and thus it is not possible to correctly manage the health condition of the cow.

Regarding this, JP 2019-100708 A discloses "a terminal positioning system that estimates the position of a positioning target terminal in a facility, and includes a plurality of beacons that are respectively arranged at plurality of predetermined locations in the facility and emit beacon waves representing beacon identification information different from each other, a receiving unit that is provided in the positioning target terminal and receives the beacon wave, a storage unit that stores storage information in which the installation position of each beacon and the beacon identification information are associated with each other, and a calculation processing unit that estimates and calculates the position of the positioning target terminal based on information on reception of the beacon wave and the storage information" (Claim 1).

JP 2012-29027 A discloses "a pairing method in an in-vehicle terminal that performs short-range wireless communication pairing with a portable terminal, the method including, by the in-vehicle terminal, a step of detecting a trigger for starting pairing processing, a step of starting a search mode of searching for the portable terminal when the trigger for starting pairing processing is detected, and a step of transitioning to a waiting mode of waiting for a search from the portable terminal when it is not possible to detect the portable terminal in the search mode" (claim 2).

SUMMARY OF THE INVENTION

JP 2019-100708 A discloses a technique for determining the position of the sensor by the beacon. However, when the position of the sensing target dynamically changes, it is not possible to determine the correspondence relationship between the sensing target and the sensor only by the position of the sensor.

Further, JP 2012-29027 A discloses a technique for pairing two devices. When JP 2012-29027 A is applied, it is possible to determine the relationship between the sensing target and the sensor by pairing the sensor and an individual identification tag fixed to the sensing target, and assigning an ID of the individual identification tag when the sensor transmit data. However, the sensor may drive by a battery in many cases, and it may be difficult to implement extra processing other than sensing due to the problem of power consumption in many cases.

An object of the present invention is to provide a method for determining the correspondence relationship between a sensing target and a sensor without pairing the sensors with each other.

In the present invention, a plurality of sensors such as an individual identification sensor and a status checking sensor attached to a sensing target are associated with each other. Then, when the position information of the various sensors associated with the sensing target deviates by a predetermined distance or more, it is determined that a discrepancy has occurred in the correspondence relationship between the sensing target and the sensor.

According to an example of "a method for determining a correspondence relationship between a sensing target and a sensor" in the present invention, there is provided a method for determining a correspondence relationship between a sensing target and a sensor, which is a correspondence relationship determination method for determining whether or not a correspondence relationship between a sensing target and a sensor attached to the sensing target is correct. The method includes acquiring position information of a first sensor fixed and attached to the sensing target, acquiring position information of a second sensor detachably attached to the sensing target, and obtaining a distance by comparing the position information of the first sensor and the position information of the second sensor, and determining that the correspondence relationship between the sensing target and the second sensor indicates discrepancy when the distance is equal to or more than a threshold value.

According to the present invention, it is possible to avoid discrepancy in the correspondence relationship between the sensing target and the sensor, and it is possible to prevent a mistake for the sensor data.

Objects, configurations, and advantageous effects other than those described above will be clarified by the descriptions of the following embodiments.

BRIEF DESCRIPTION OF THE DRAWINGS

FIG. 3 is a diagram illustrating a configuration of a cow management collection stored by the cow management server in the first embodiment;

FIG. 4 is a diagram illustrating a configuration of a wearable sensor management collection stored by the cow management server in the first embodiment;

FIG. 11 is a diagram illustrating a configuration of a device management collection stored by the device management server in the first embodiment;

FIG. 12 is a diagram illustrating a configuration of a gateway management collection stored by the device management server in the first embodiment;

FIG. 15 is a diagram illustrating a device status display GUI displayed by the device management server in the first embodiment;

FIG. 21 is a diagram illustrating a configuration of a tag management collection stored by the device management server in the third embodiment;

DESCRIPTION OF THE PREFERRED EMBODIMENTS

Figure 1:
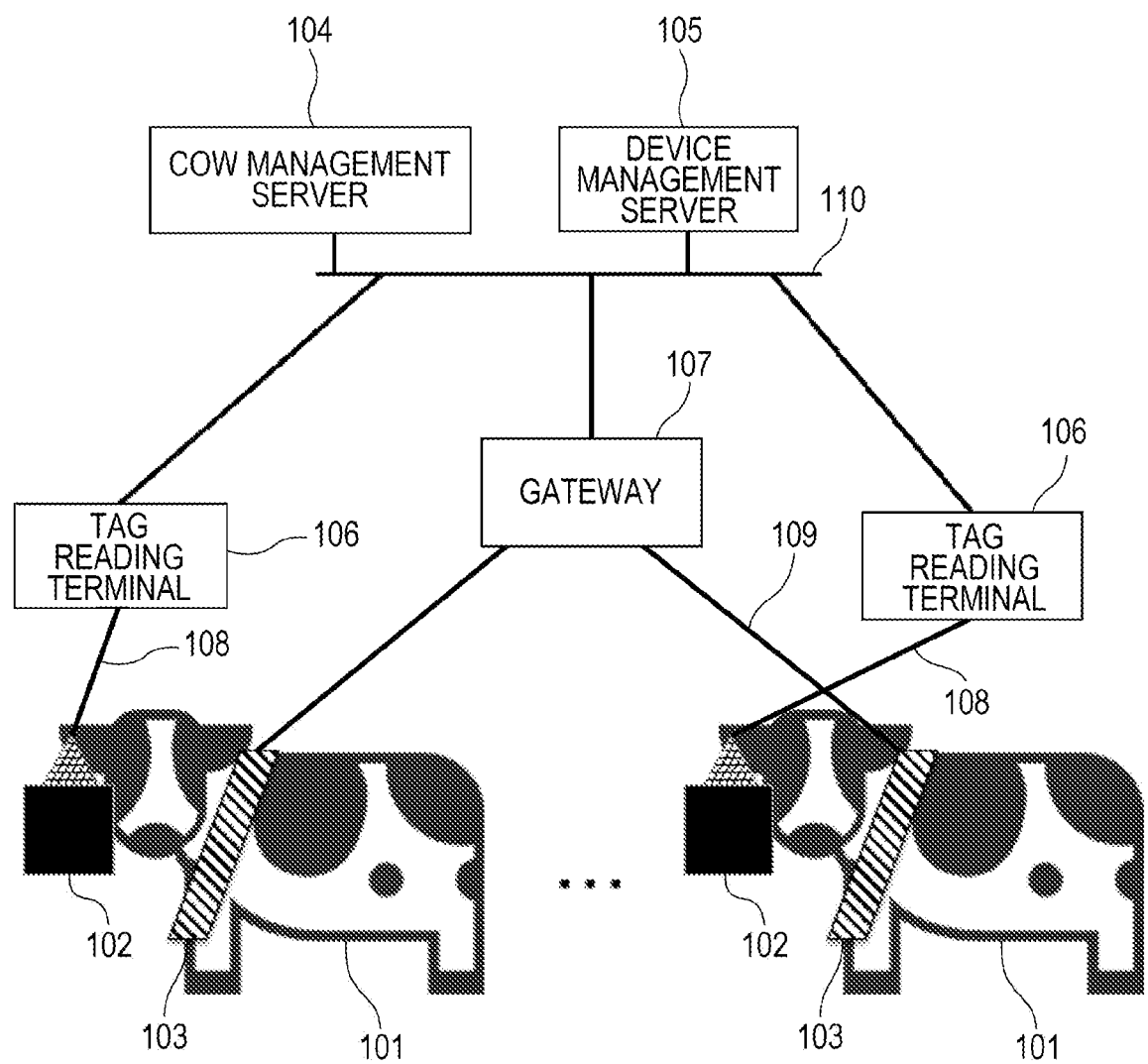
FIG. 1 is a diagram illustrating an overall configuration of a cow management system according to a first embodiment.

Hereinafter, embodiments of the present invention will be described with reference to the drawings. In addition, in the drawings for explaining the embodiments, the same components are denoted by the same names and the same reference signs, and repetitive description thereof will be omitted.

First Embodiment

FIG. 1 is a schematic view illustrating a cow management system for managing a cow on a ranch or the like to which a first embodiment of the present invention is applied. As illustrated in FIG. 1, the cow management system in the present embodiment includes at least one head of a cow 101, an ear tag 102 fixed to the cow 101, a wearable sensor 103 attached to the cow, a cow management server 104, a device management server 105, at least one tag reading terminal 106, and at least one gateway 107. The ear tag 102 and the tag reading terminal 106 are connected to each other via a tag network 108. The wearable sensor 103 and the gateway 107 are connected to each other by a sensor network 109. The cow management server 104, the device management server 105, the tag reading terminal 106, and the gateway 107 are connected to each other by a management network 110.

The tag reading terminal 106 is equipped with a GPS function to enable acquisition of position information of the tag reading terminal. The tag reading terminal 106 reads the individual identification number stored by the ear tag 102, transmits the position information and the individual identification number to the cow management server 104, and acquires and displays cow management information stored by the cow management server 104. The tag reading terminal 106 reads the ear tag 102 at a short distance of, for example, 10 cm or less.

The wearable sensor 103 attached to the cow is a status checking sensor. The wearable sensor measures the activity amount of the cow 101, and periodically transmits the measured activity amount to the gateway 107. When the gateway 107 acquires data from the wearable sensor 103, the gateway transfers the data to the cow management server 104. The gateway 107 can perform positioning of the position of the wearable sensor 103 based on the radio wave intensity of the wearable sensor 103, and transmits position information of the wearable sensor 103 as a response to a request.

In the present embodiment, the wearable sensor 103 transmits data to the cow management server 104 via the gateway 107. In addition, for example, data transmission from the wearable sensor 103 to the cow management server 104 may be directly performed using a mobile line. At this time, it is assumed that the position information (position information and the like of an SIM) of the wearable sensor 103 is acquired from a mobile line carrier.

Figure 2:
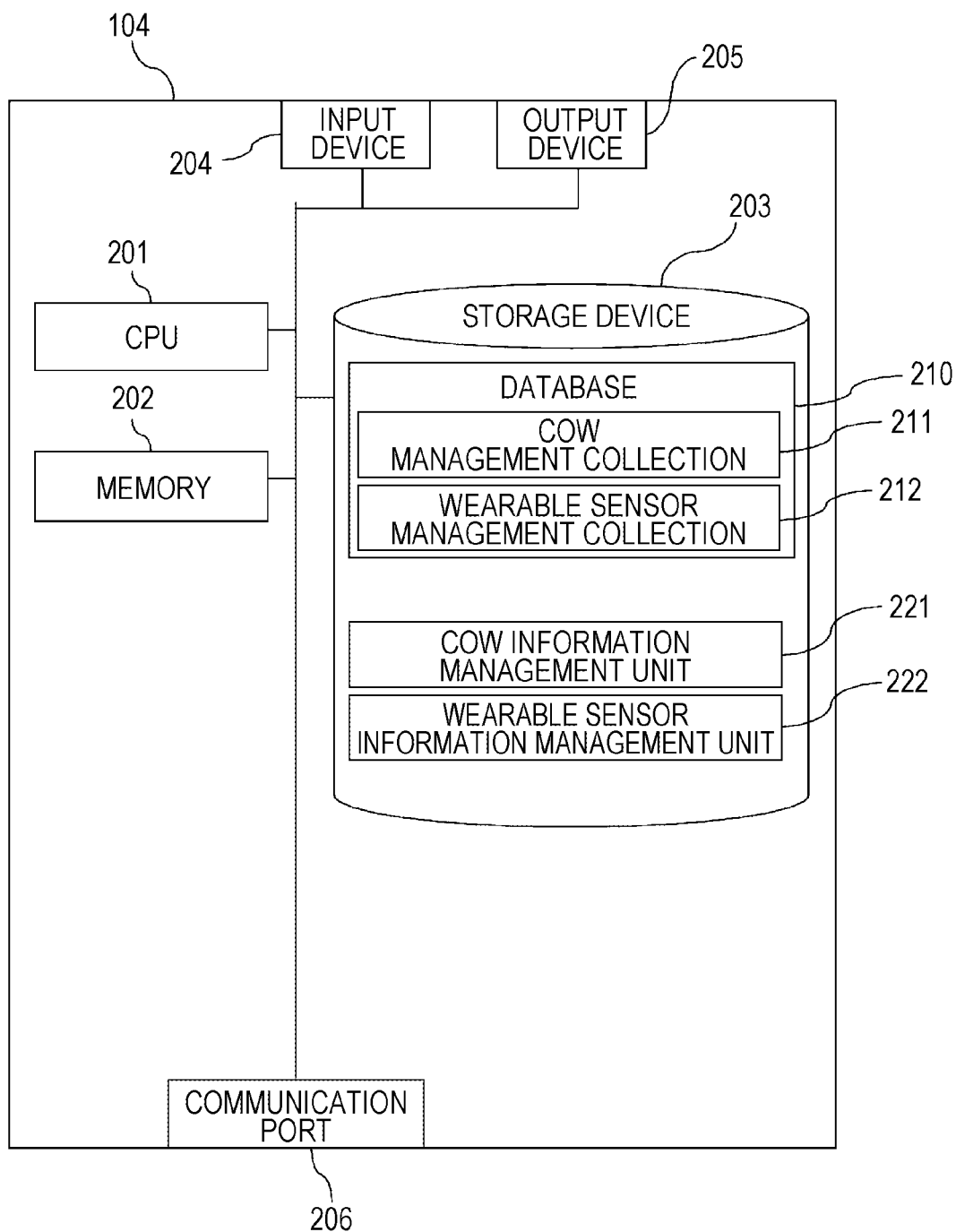
FIG. 2 is a diagram illustrating a configuration of a cow management server in the first embodiment.

FIG. 2 is a diagram illustrating the configuration of the cow management server 104. The cow management server 104 includes a CPU 201, a memory 202, a storage device 203, an input device 204, an output device 205, and a communication port 206.

The storage device 203 stores a database 210, a program forming a cow information management unit 221, and a program forming a wearable sensor information management unit 222. In execution, the program is loaded into the memory 202 and then executed.

A cow management collection 211 in which information for managing a cow is stored, and a wearable sensor management collection 212 for managing a wearable sensor are stored in the database 210.

The cow management collection 211 will be described with reference to FIG. 3.

The cow management collection 211 is configured by one or a plurality of documents 300.

The document 300 includes thing_id 310, static 320, state 330, and sensor 340. thing_id 310 stores the individual identification number for identifying a head of cow. static 320 stores static information of the cow such as date of birth and gender. state 330 stores cow management information such as milk yield, which is generated daily. sensor 340 stores information on the wearable sensor.

The wearable sensor management collection 212 will be described with reference to FIG. 4.

The wearable sensor management collection 212 is configured by one or a plurality of documents 400.

The document 400 includes sensor_id 410 and mapped_thing 420. sensor_id 410 stores an ID for identifying the wearable sensor. mapped_thing 420 stores the individual identification number of the cow to which the wearable sensor is attached.

Figure 5:
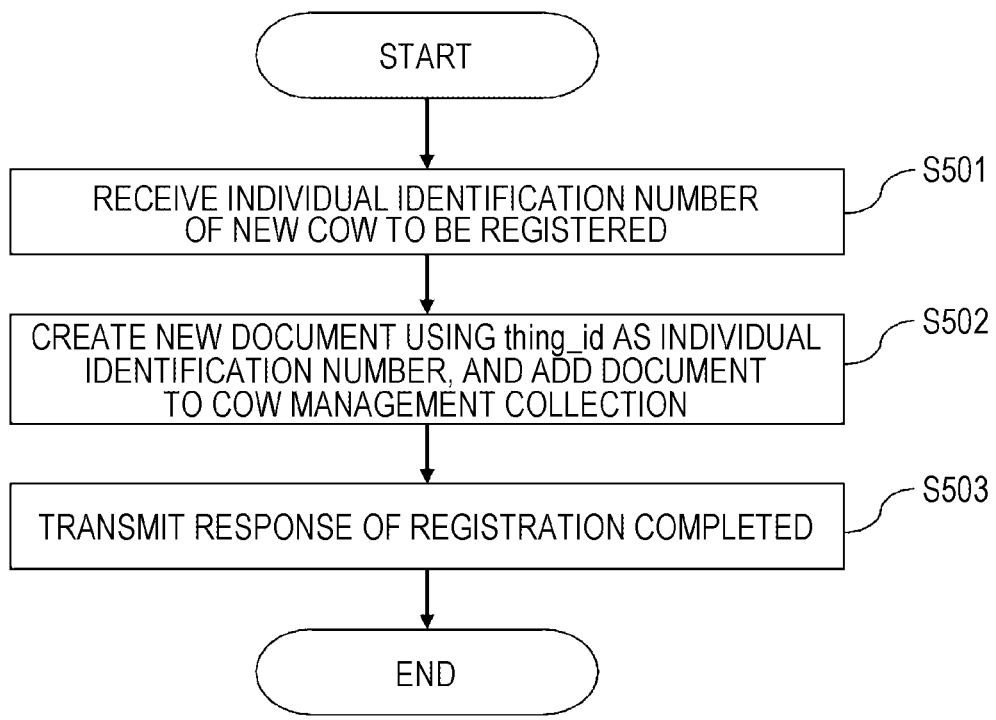
FIG. 5 is a diagram illustrating a flow of cow registration processing in a cow information management unit of the cow management server in the first embodiment.

FIG. 5 is a flowchart illustrating processing performed in cow registration in the cow information management unit 221.

Upon receiving the individual identification number of the newly registered cow 101 (S501), the cow information management unit 221 creates a new document in which the received individual identification number is stored in thing_id 310 in the cow management collection 211. At this time, in a case where information other than individual information is included, this information is stored in static 320 of the new document (S502). Finally, the response indicating that the registration is completed is transmitted (S503).

The description of the processing performed in the cow registration in the cow information management unit 221 has been made above.

Figure 6:
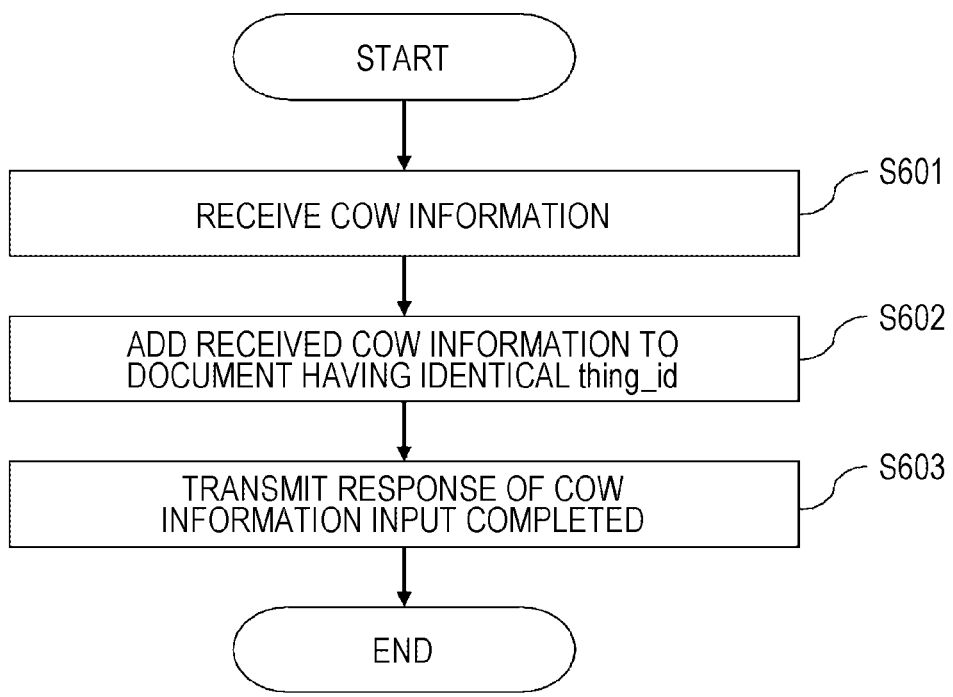
FIG. 6 is a diagram illustrating a flow of input processing of cow management information in a cow information management unit of the cow management server in the first embodiment.

FIG. 6 is a flowchart illustrating processing performed in the cow information management unit 221 when the cow management information that is generated daily is input.

When the cow information management unit 221 receives the cow management information (S601), the cow information management unit searches for the document 300 having an individual identification number that is identical to the individual identification number of thing_id 310, from the cow management collection 211. Then, the cow information management unit stores the received cow management information in state 330 (S602). Finally, the response indicating that the input is completed is transmitted (S603).

The description of the processing performed in the cow information management unit 221 when the cow management information is input has been made above.

Figure 7:
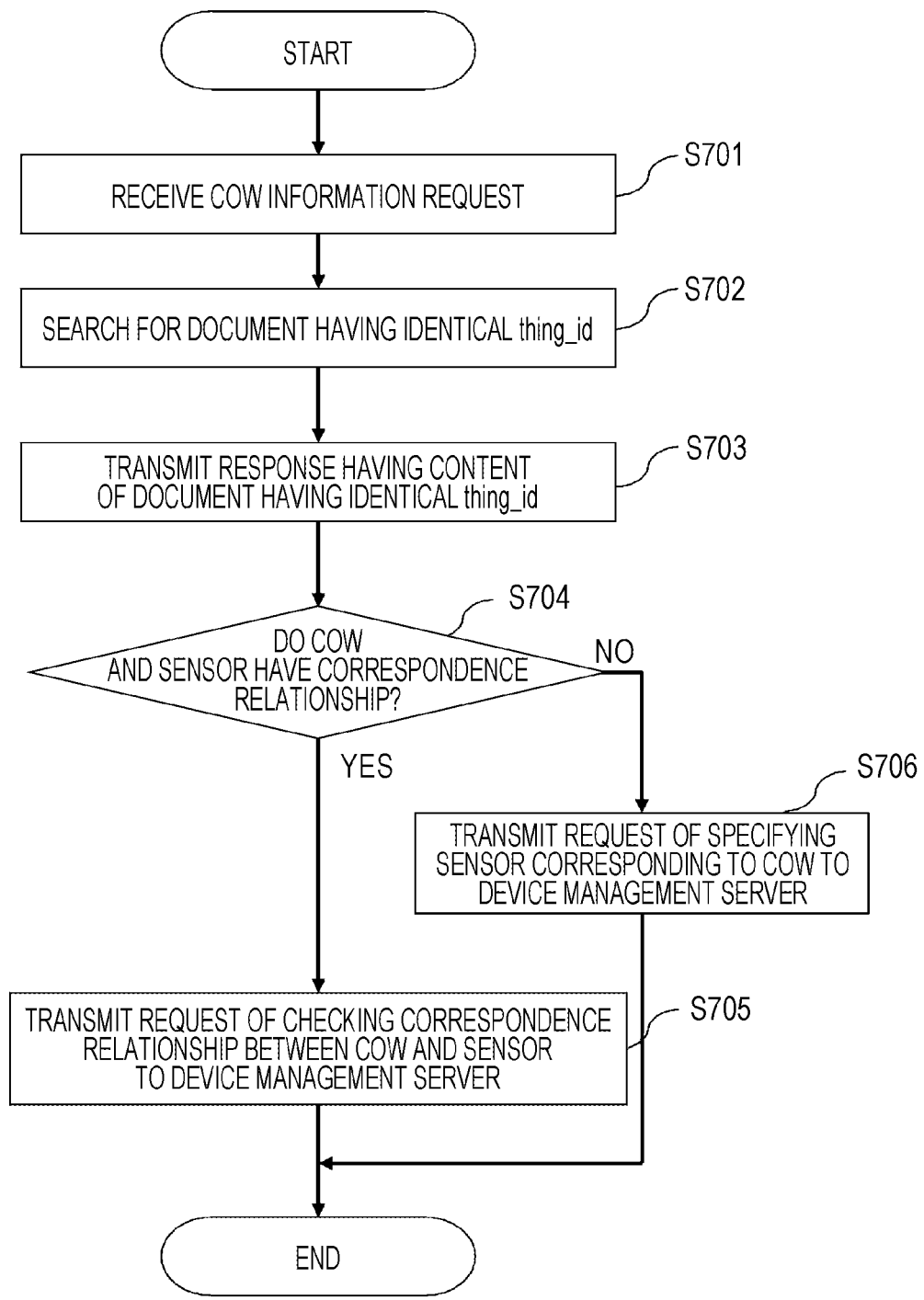
FIG. 7 is a diagram illustrating a flow of output processing of cow management information in a cow information management unit of the cow management server in the first embodiment.

FIG. 7 is a flowchart illustrating processing performed in the cow information management unit 221 when cow information is output.

Upon receiving a request of the cow information (S701), the cow information management unit 221 searches the document 300 having thing_id 310 that is identical to the individual identification number included in the request, from the cow management collection 211 (S702). Then, the cow information management unit transmits the contents of the document 300 having the identical thing_id, as a response (S703).

Then, the cow information management unit 221 determines whether or not there is a document 400 in which the individual identification information included in the request is stored in mapped_thing 420, from the wearable sensor management collection 212 (S704). When there is the document 400, the cow information management unit transmits a request of determining the correspondence relationship between the head of cow and the sensor, to the device management server 105 (S705). When there is no document 400, the cow information management unit transmits a request of checking whether or not there is the sensor corresponding to the head of cow, to the device management server 105 (S706).

The description of the processing performed in the cow information management unit 221 when the cow information is output has been made above.

Figure 8:
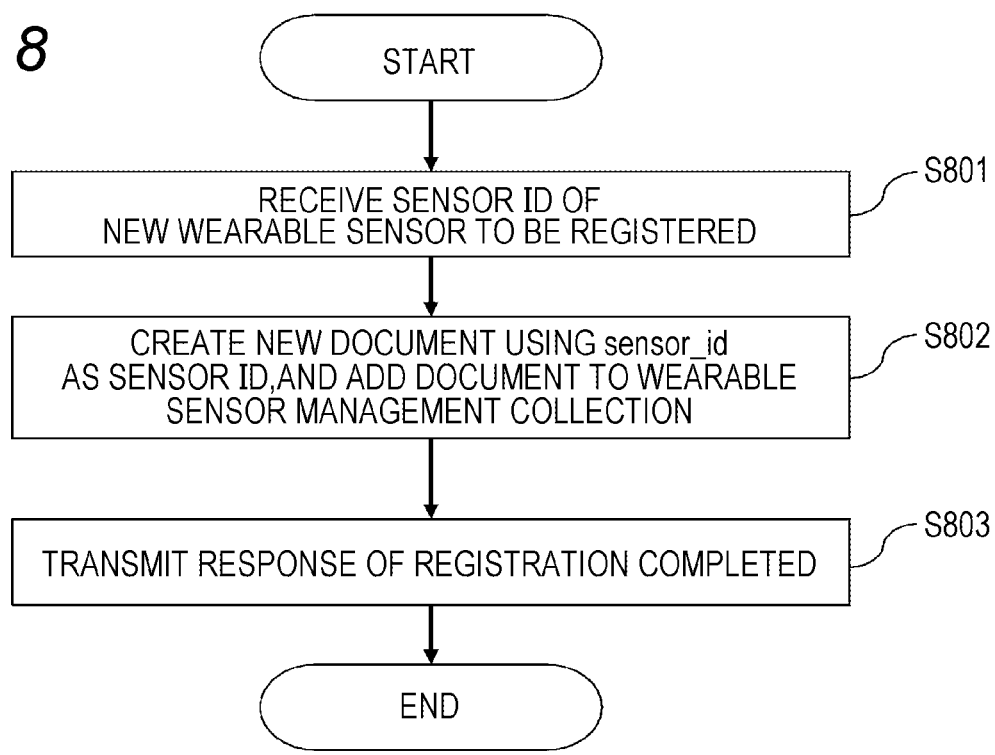
FIG. 8 is a diagram illustrating a flow of wearable sensor registration processing in a wearable sensor management unit of the cow management server in the first embodiment.

FIG. 8 is a flowchart illustrating processing performed in the wearable sensor information management unit 222 when the wearable sensor is registered.

When the wearable sensor information management unit 222 receives a device ID of the newly registered wearable sensor 103 (S801), the wearable sensor information management unit 222 creates a new document in which the received device ID is stored in sensor_id 410, in the wearable sensor management collection 212 (S802). Finally, the response indicating the registration is completed is transmitted (S803).

The description of the processing performed in the wearable sensor information management unit 222 when the wearable sensor is registered has been made above.

Figure 9:
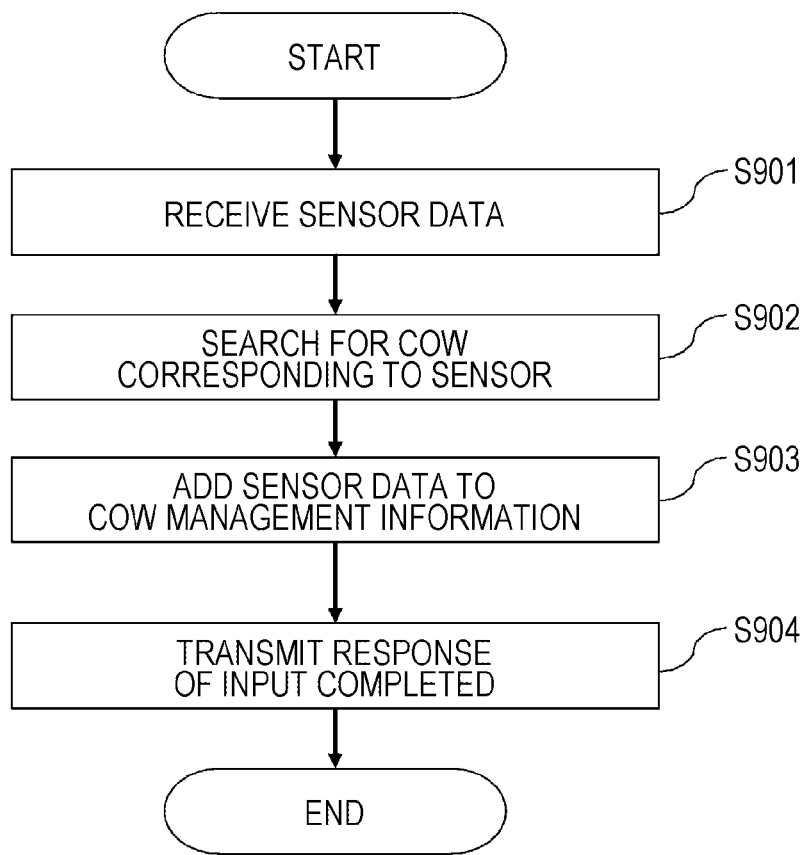
FIG. 9 is a diagram illustrating a flow of input processing of sensor data of a wearable sensor in the wearable sensor management unit of the cow management server in the first embodiment.

FIG. 9 is a flowchart illustrating processing performed in the wearable sensor information management unit 222 when data of the wearable sensor is input.

Upon receiving sensor data (S901), the wearable sensor information management unit 222 searches for the document 400 having sensor_id 410 that coincides with a device ID included in the received sensor data, from the wearable sensor management collection 212. Then, the wearable sensor information management unit acquires the value of mapped_thing 420 (S902). Then, the wearable sensor information management unit searches the document 300 having thing_id 310 that coincides with mapped_thing 420, from the cow management collection 211. Then, the wearable sensor information management unit adds the received sensor data to sensor 340 (S903), and then transmits a response indicating the input is completed (S904).

Figure 10:
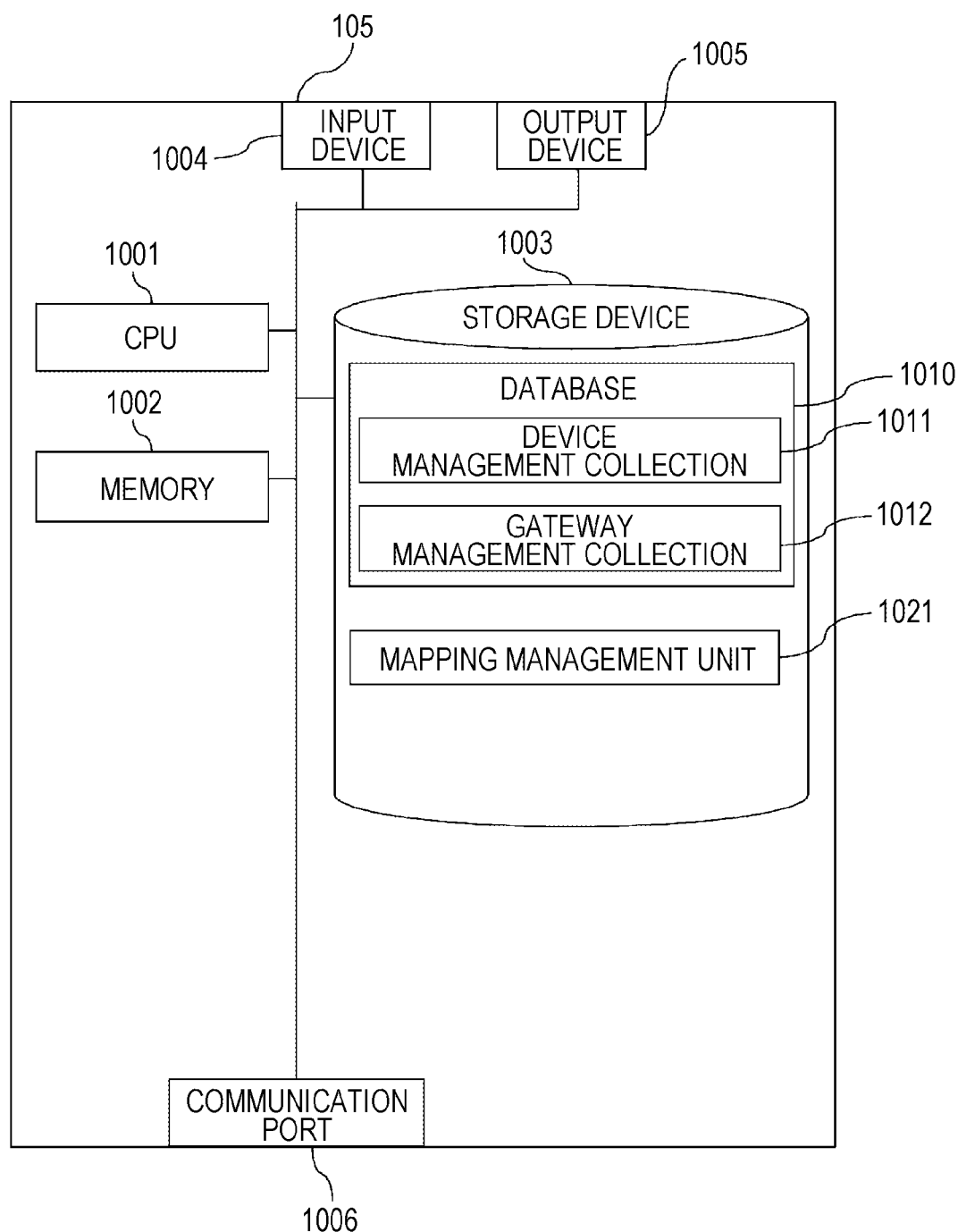
FIG. 10 is a diagram illustrating a configuration of a device management server in the first embodiment.

FIG. 10 is a diagram illustrating the configuration of the device management server 105.

The device management server 105 includes a CPU 1001, a memory 1002, a storage device 1003, an input device 1004, an output device 1005, and a communication port 1006.

The storage device 1003 stores a database 1010 and a program forming a mapping management unit 1021. In execution, the program is loaded into the memory 1002 and then is executed.

The database 1010 stores a device management collection 1011 that stores information for managing devices, and a gateway management collection 1012 that stores information on the gateway 107 as the destination of position information acquisition of the wearable sensor 103.

The device management collection 1011 will be described with reference to FIG. 11.

The device management collection 1011 is configured by one or a plurality of documents 1100. The document 1100 is configured by sensor_id 1110 that stores an ID for identifying the device and url 1120 that stores a destination for collecting the position information of the sensor.

The gateway management collection 1012 will be described with reference to FIG. 12.

The gateway management collection 1012 is configured by one or a plurality of documents 1200. The document 1200 is configured by gateway_id 1210 that stores an ID for identifying the gateway 107 and url 1220 that stores a destination for collecting the position information of the sensor.

Figure 13:
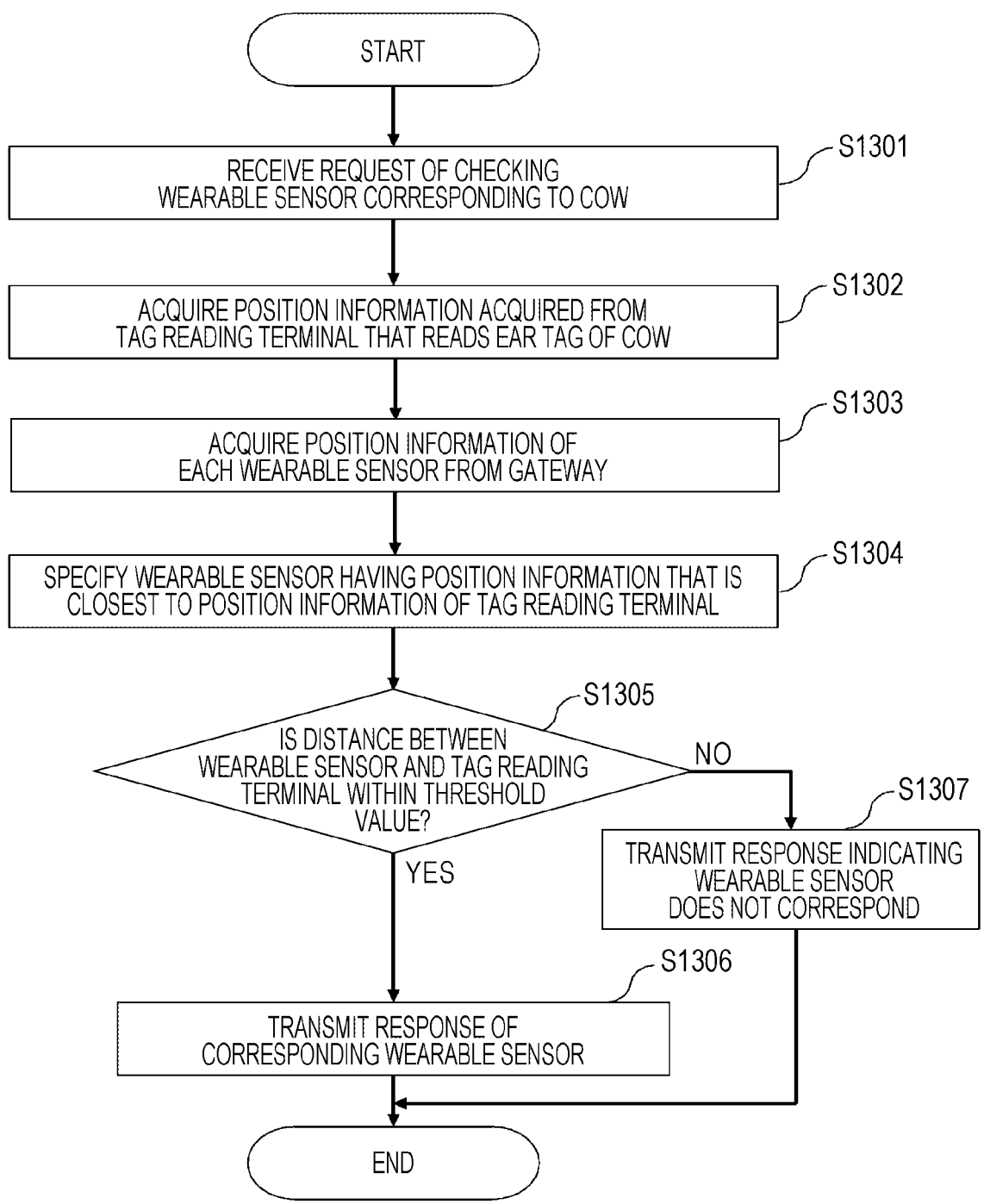
FIG. 13 is a diagram illustrating a flow of specifying processing of the wearable sensor corresponding to a cow in a mapping management unit of the device management server in the first embodiment.

FIG. 13 is a flowchart illustrating specifying processing of the wearable sensor 103 corresponding to the cow 101, in the mapping management unit 1021.

When the mapping management unit 1021 receives a request of checking the sensor corresponding to the cow (S1301), the mapping management unit acquires the position information acquired from the tag reading terminal that reads the ear tag of the cow, which is included in the check request, as the position information of the cow (S1302).

Then, the position information of the wearable sensor 103 is requested from the url 1220 stored in all the documents 1200 of the gateway management collection 1012, and pieces of the position information of all the wearable sensors 103 are acquired (S1303).

Then, the position information of the cow 101 is compared with the pieces of the position information of all the wearable sensors 103 to specify the wearable sensor 103 that is closest to the cow 101 (S1304).

Then, it is checked whether the distance between the cow 101 and the specified wearable sensor 103 is within a predetermined threshold value (S1305). When the distance is within the threshold value, a response of the device ID of the specified wearable sensor is transmitted (S1306). Otherwise, a response indicating that there is no corresponding wearable sensor is transmitted (S1207).

The description of the processing of specifying the wearable sensor corresponding to the cow in the mapping management unit 1021 has been made above.

Figure 14:
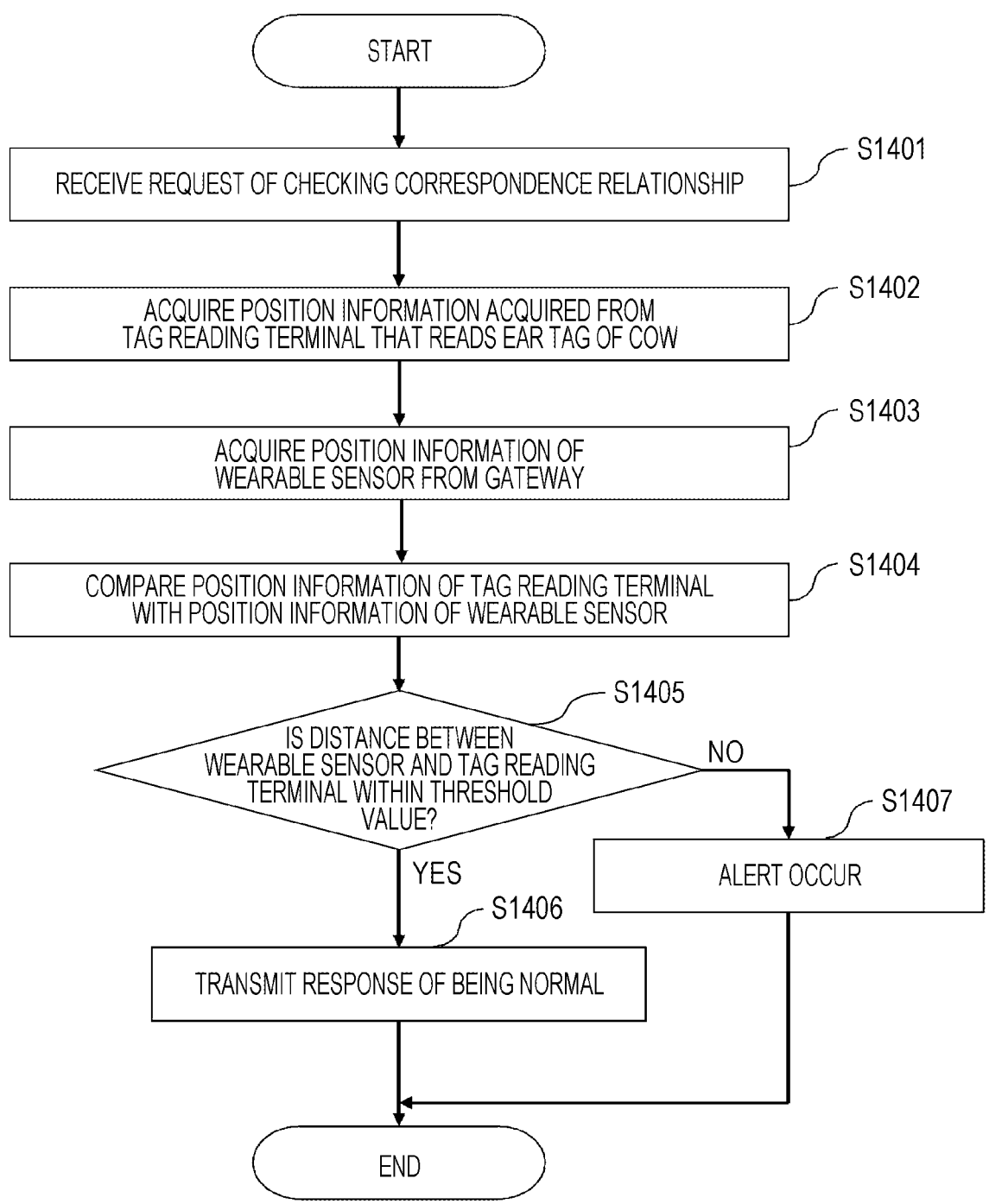
FIG. 14 is a diagram illustrating a flow of correspondence relationship determining processing between cow and the wearable sensor in the mapping management unit of the device management server in the first embodiment.

FIG. 14 is a flowchart illustrating processing performed in the mapping management unit 1021 when the correspondence relationship between the cow 101 and the wearable sensor 103 is determined.

When the mapping management unit 1021 receives a request of determining the correspondence relationship (S1401), the mapping management unit acquires the position information acquired from the tag reading terminal that reads the ear tag of the cow, which is included in the determination request, as the position information of the cow (S1402).

Then, the mapping management unit searches the document 1100 having sensor_id 1110 that is identical to sensor_id included in the determination request, from the device management collection 1011. Then, the mapping management unit requests a request of the position information of the wearable sensor 103 from url 1120, and acquires the position information of the corresponding wearable sensor 103 from the gateway 107 (S1403).

Then, the mapping management unit compares the position information of the cow with the position information of the wearable sensor to specify the distance (S1404).

Then, the mapping management unit checks whether the specified distance is within the predetermined threshold value (S1405). When the distance is within the predetermined threshold value, a response indicating being normal is transmitted (S1406). Otherwise, an alert is issued (S1407). The alert may be sound or display.

The description of the processing performed in the mapping management unit 1021 when the correspondence relationship between the cow 101 and the wearable sensor 103 is determined has been made above.

FIG. 15 illustrates an example of a device status display GUI displayed by the device management server 105.

The device status display GUI is configured by sensor_id 1501 for identifying the wearable sensor, status 1502 that indicates the life or death of the wearable sensor, mapped_thing 1503 that indicates the cow to which the wearable sensor is attached, and mapping_status 1504 that indicates the status of the correspondence relationship between the cow and the wearable sensor. When the correspondence relationship between the cow and the wearable sensor indicates coincidence, OK is displayed. When the correspondence relationship indicates discrepancy, NG is displayed.

In FIG. 1, the cow management server 104 and the device management server 105 are separate servers. The two servers may be combined into one management server (management device).

In the present embodiment, the position information of a plurality of sensors (fixed and attached ear tags and detachable wearable sensors) attached to the cow, which is the same sensing target, is acquired. Then, the position information of the ear tag is compared with the position information of the wearable sensor to specify the distance. When the specified distance is not within the threshold value, it is determined that the correspondence relationship between the cow and the wearable sensor indicates discrepancy, and an alert is issued.

According to the present embodiment, it is possible to avoid an occurrence that the correspondence relationship between the cow and the wearable sensor indicates discrepancy, and it is possible to manage the cow using the correct sensor data.

Second Embodiment

Figure 16:
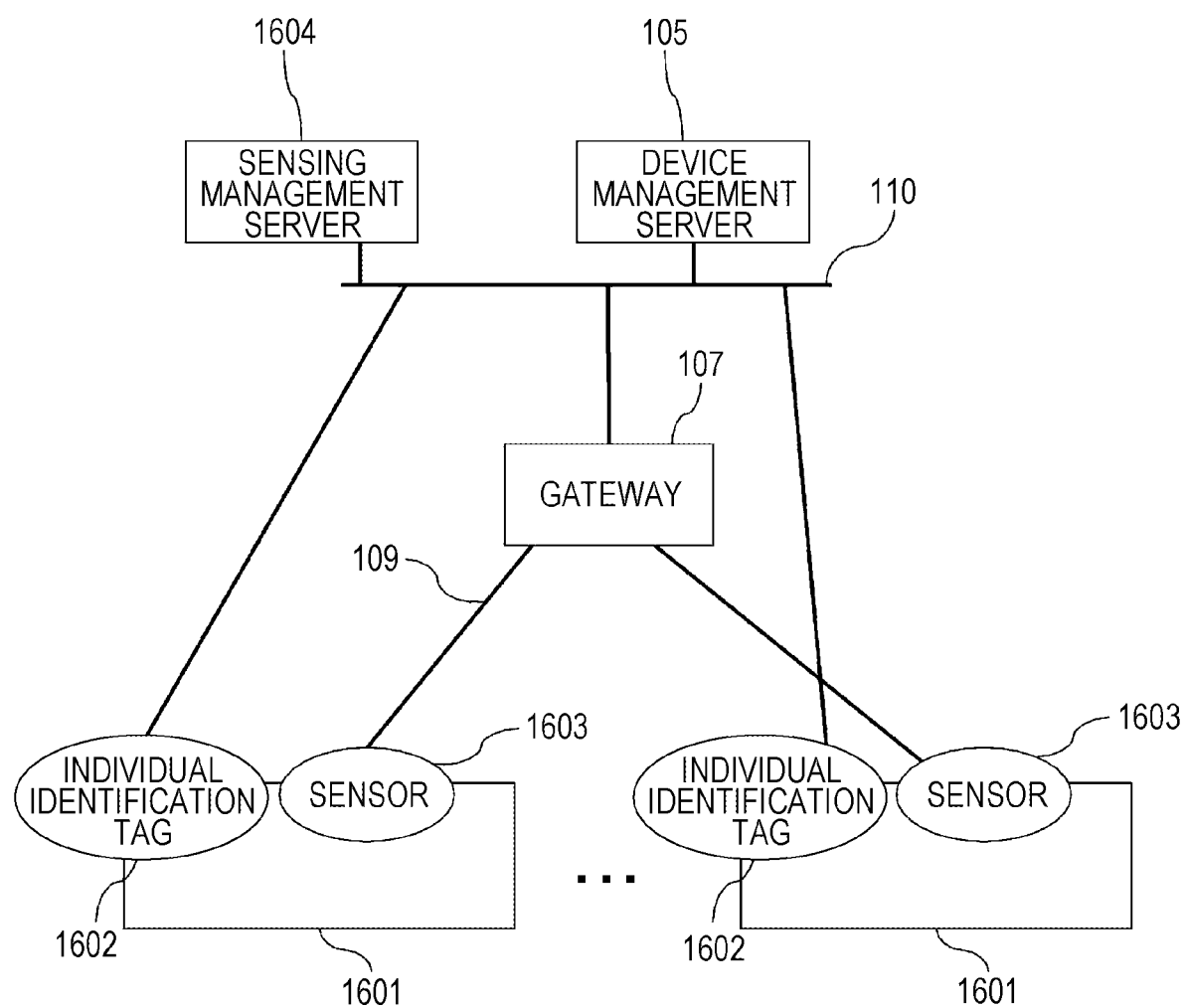
FIG. 16 is a diagram illustrating an overall configuration of an IoT system according to a second embodiment.

FIG. 16 is a schematic view of an IoT system according to a second embodiment of the present invention. The present embodiment is used for an article as the sensing target. The configuration in the second embodiment is substantially similar to the configuration in the first embodiment. However, the cow 101 is changed to a thing 1601 as the sensing target, the ear tag 102 is changed to an individual identification tag 1602, the wearable sensor 103 is changed to a sensor 1603, and the cow management server 104 is changed to a sensing management server 1604.

The individual identification tag 1602 is connected to the management network 110 via a mobile line. The position information of the individual identification tag 1602 is obtained from the mobile line carrier. The individual identification tag 1602 may perform communication via the tag reading terminal 106 as in the first embodiment, and use the position information of the tag reading terminal 106 as the position information of the individual identification tag.

Figure 17:
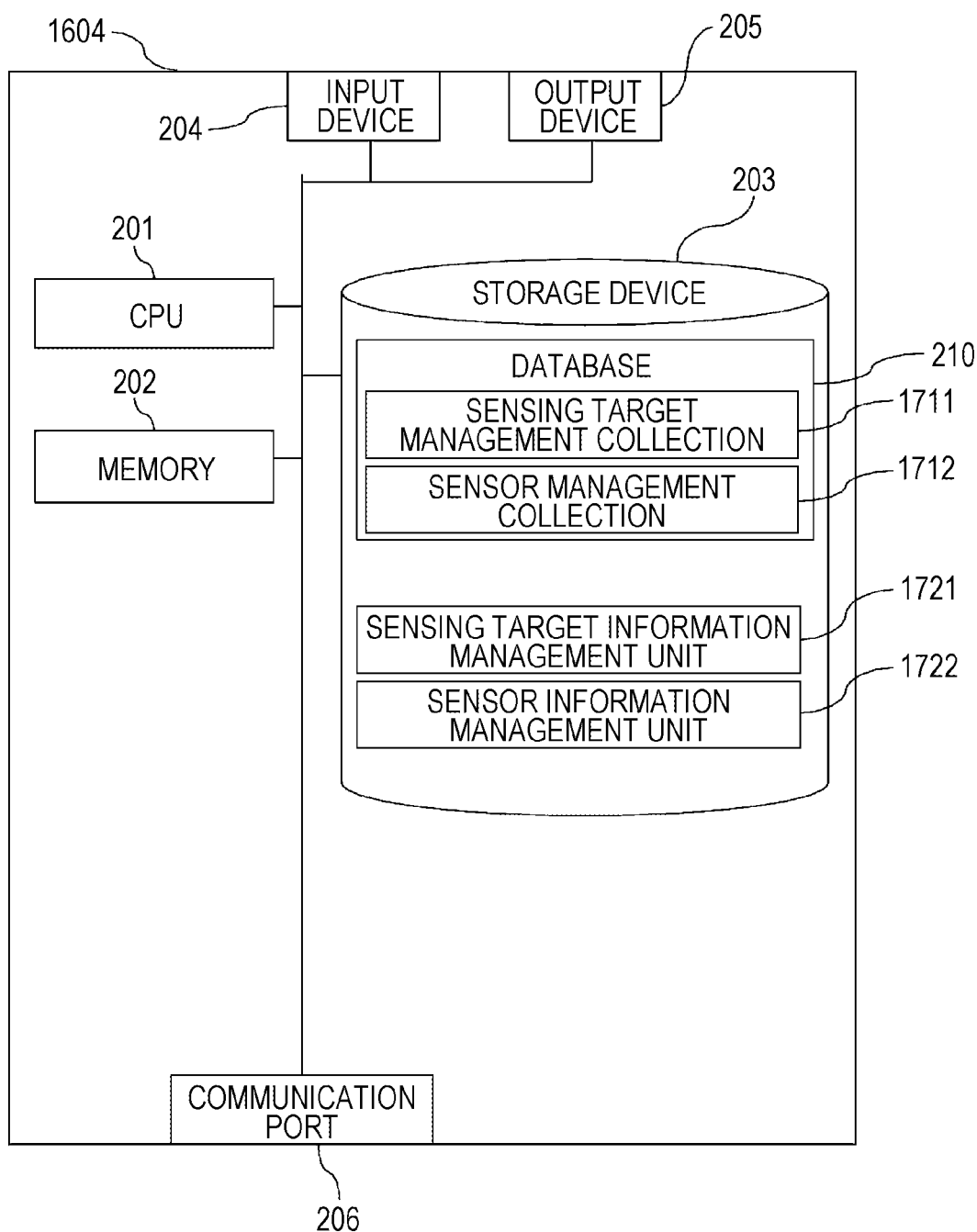
FIG. 17 is a diagram illustrating a configuration of a sensing management server in the second embodiment.

FIG. 17 illustrates the configuration of the sensing management server. The storage device 203 in the sensing management server 1604 stores a database 210, a program forming a sensing target information management unit 1721, and a program forming a sensor information management unit 1722. In execution, the program is loaded into the memory 202 and then executed. In addition, a sensing target management collection 1711 in which information for managing the sensing target is stored and a sensor management collection 1712 for managing the sensor are stored in the database 210.

Further, the processing in the mapping management unit 1021 of the device management server 105 is different.

Figure 18:
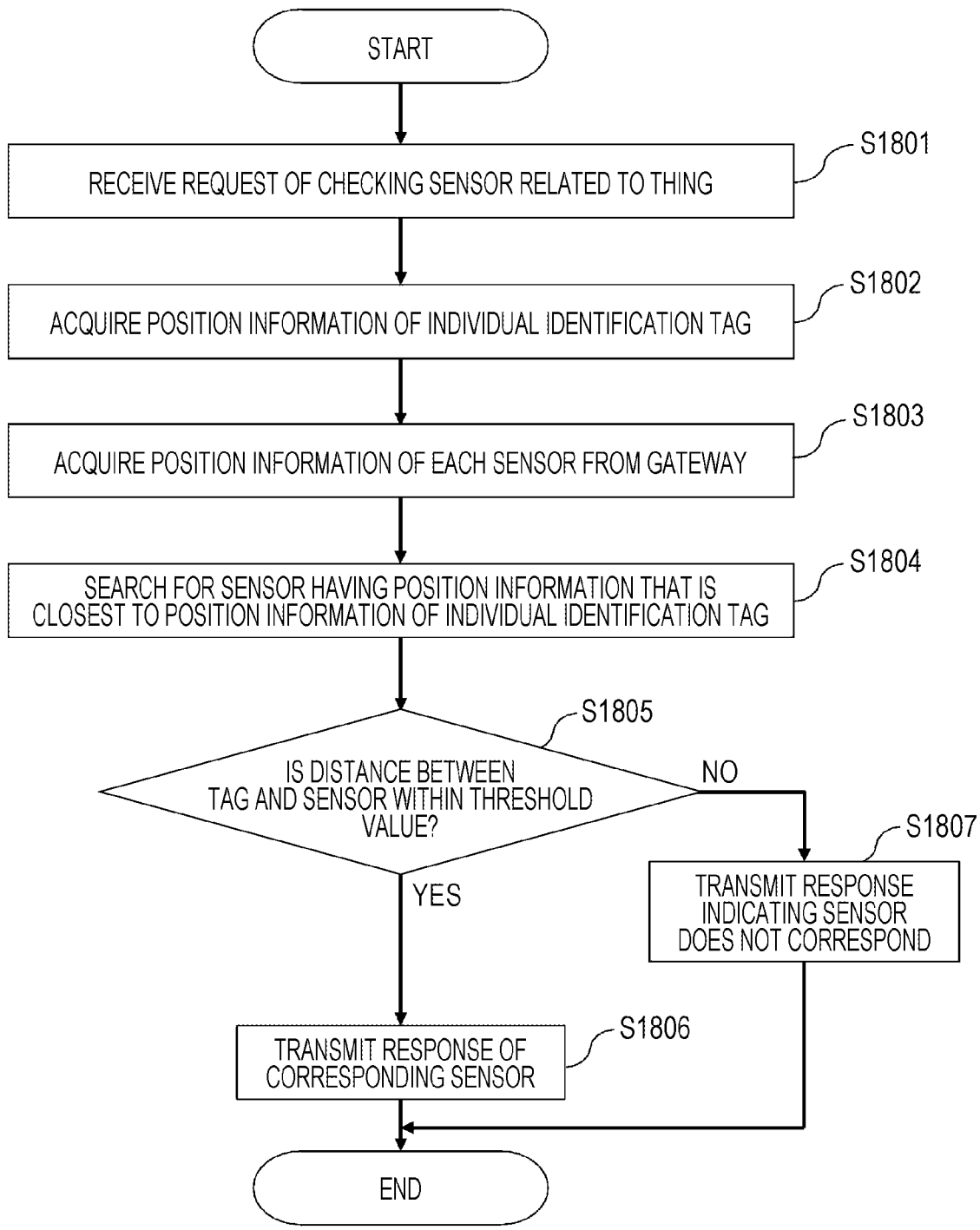
FIG. 18 is a diagram illustrating a flow of specifying processing of the sensor related to the sensing target in a mapping management unit of a device management server in the second embodiment.

FIG. 18 is a flowchart illustrating specifying processing of the sensor related to a thing as the sensing target in the mapping management unit 1021.

When the mapping management unit 1021 receives a request of checking the sensor related to a thing (S1801), the mapping management unit acquires position information of the individual identification tag 1602 included in the checking request, and then uses the acquired position information as the position of the thing as the sensing target (S1802).

Then, the position information of the sensor 1603 is requested from the url 1220 stored in all the documents 1200 of the gateway management collection 1012, and pieces of the position information of all the sensors 1603 are acquired (S1803).

Then, the position information of the thing 1601 as the sensing target is compared with the position information of all the sensors 1603 to specify the sensor 1603 that is closest to the thing 1601 as the sensing target (S1804).

Then, it is checked whether the distance between the thing 1601 as the sensing target and the specified sensor 1603 is within a predetermined threshold value (S1805). When the distance is within the threshold value, a response of the device ID of the specified sensor 1603 is transmitted (S1806). Otherwise, a response indicating that there is no corresponding sensor is transmitted (S1807).

The description of the specifying processing of the sensor 1603 corresponding to the thing 1601 as the sensing target, in the mapping management unit 1021 has been made above.

Figure 19:
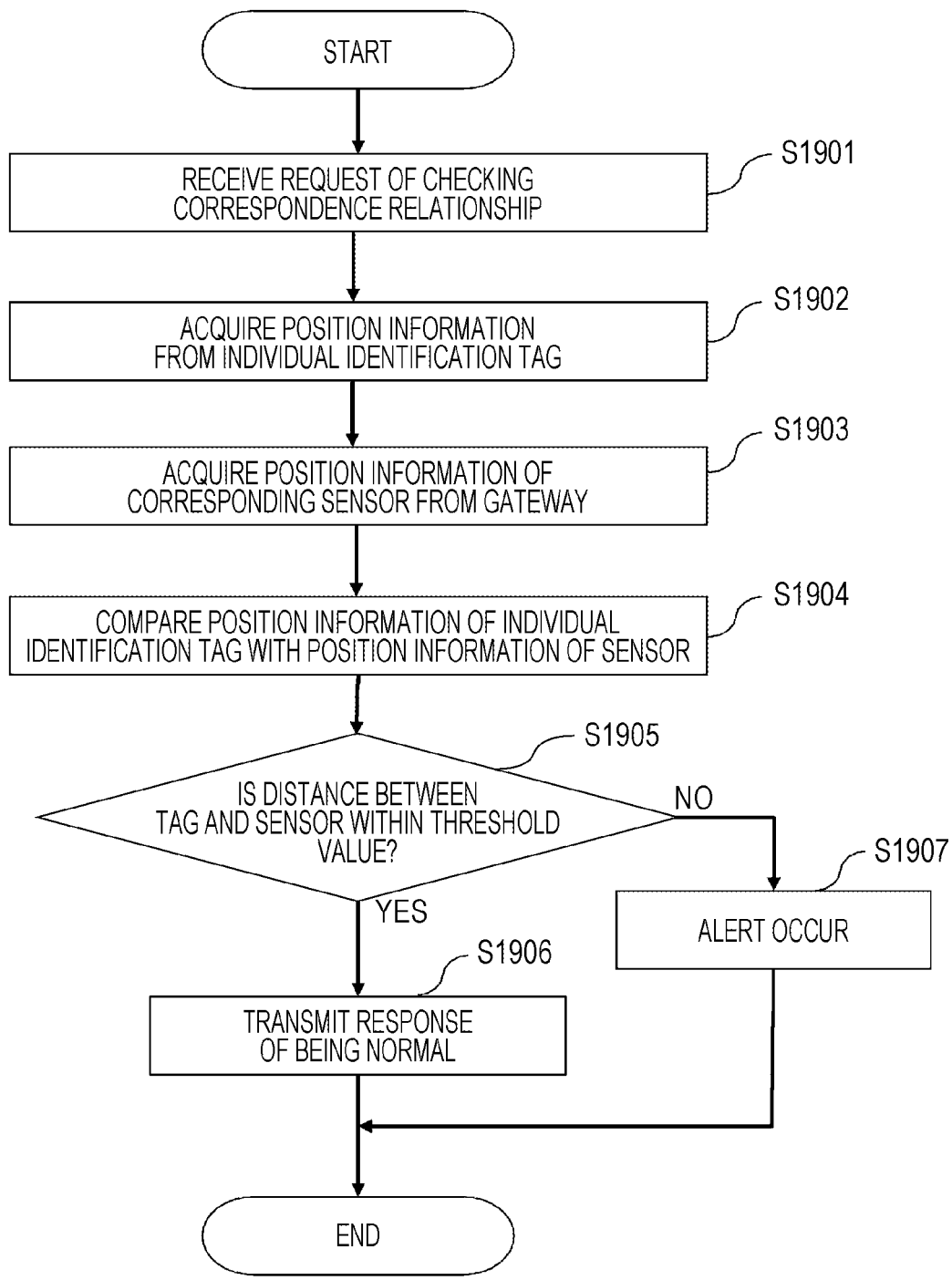
FIG. 19 is a diagram illustrating a flow of correspondence relationship determining processing between the sensing target and the sensor in the mapping management unit of the device management server in the second embodiment.

FIG. 19 is a flowchart illustrating processing performed in the mapping management unit 1021 when the correspondence relationship between the thing 1601 as the sensing target and the sensor 1603 is determined.

When the mapping management unit 1021 receives the request of determining the correspondence relationship (S1901), the mapping management unit acquires the position information of the individual identification tag 1602 included in the checking request, as the position information of the thing as the sensing target (S1902).

Then, the mapping management unit searches the document 1100 having sensor_id 1110 that is identical to sensor_id included in the determination request, from the device management collection 1011. Then, the mapping management unit requests a request of the position information of the sensor 1603 from url 1120, and acquires the position information of the sensor 1603 from the gateway 107 (S1903).

Then, the position information of the thing 1601 as the sensing target is compared with the position information of the sensor 1603 to specify the distance (S1904).

Then, the mapping management unit checks whether the specified distance is within the predetermined threshold value (S1905). When the distance is within the predetermined threshold value, a response indicating being normal is transmitted (S1906). Otherwise, an alert is issued (S1907).

The description of the processing performed in the mapping management unit 1021 when the correspondence relationship between the thing 1601 as the sensing target and the sensor 1603 is determined has been made above.

According to this embodiment, it is possible to avoid the occurrence that the correspondence relationship between a product as the sensing target and the sensor indicates discrepancy, and to realize an IoT system using the correct sensor data.

Third Embodiment

A third embodiment of the present invention will be described below with reference to the drawings. The configuration in the third embodiment is substantially similar to the configuration in the second embodiment. However, the third embodiment is different from the second embodiment in that an individual identification tag management collection is added into the device management server, and the processing in the mapping management unit 1021 of the device management server 105 is different.

Figure 20:
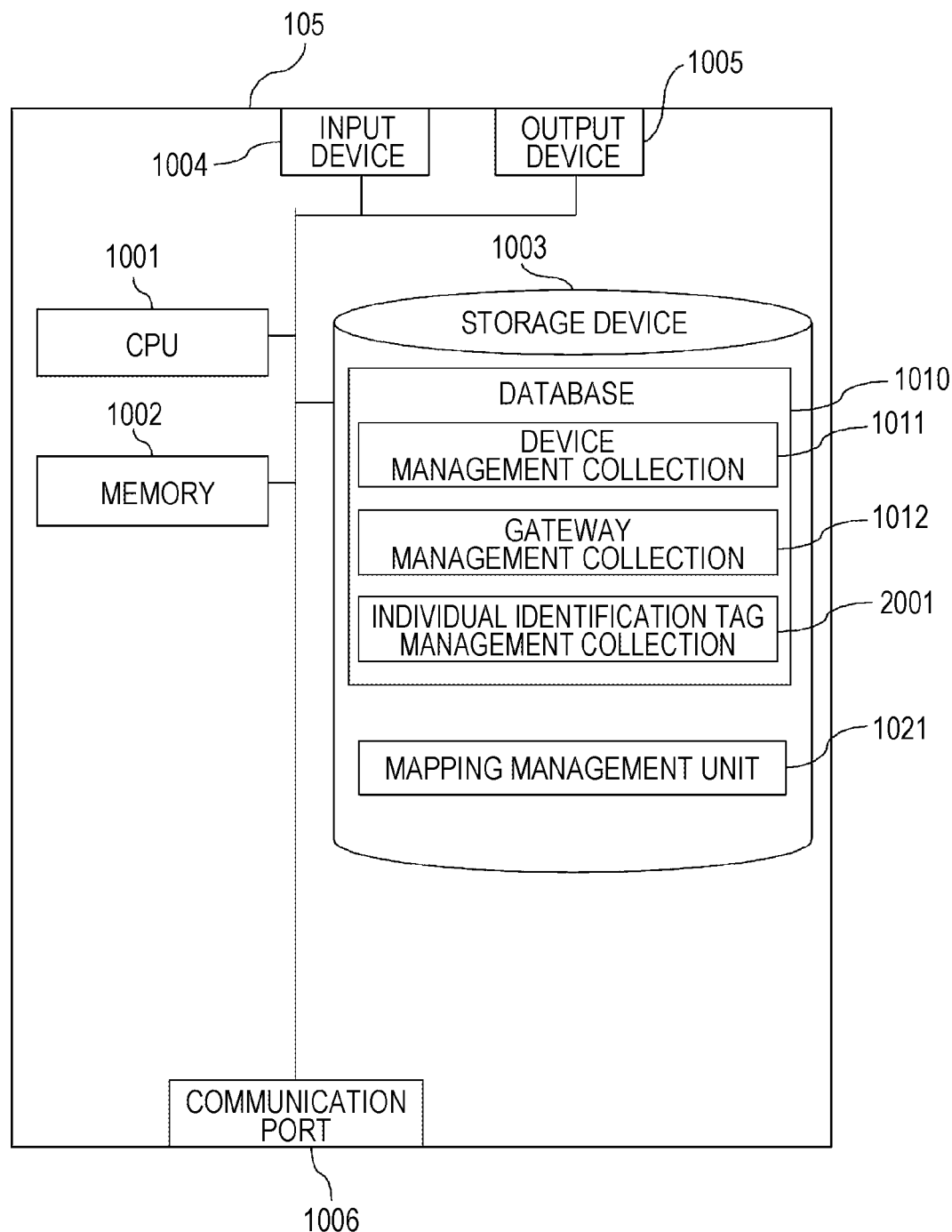
FIG. 20 is a diagram illustrating a configuration of a device management server according to a third embodiment.

FIG. 20 illustrates the configuration of the device management server 105. In addition to the configuration illustrated in FIG. 10, the database 1010 includes an individual identification tag management collection 2001.

FIG. 21 illustrates the configuration of the individual identification tag management collection 2001 stored by the device management server 105. The individual identification tag management collection 2001 is configured by one or a plurality of documents 2100. The document 2100 is configured by tag_id 2110 that stores an ID for identifying the individual identification tag, and url 2120 that stores a destination for collecting position information of the individual identification tag.

Figure 22:
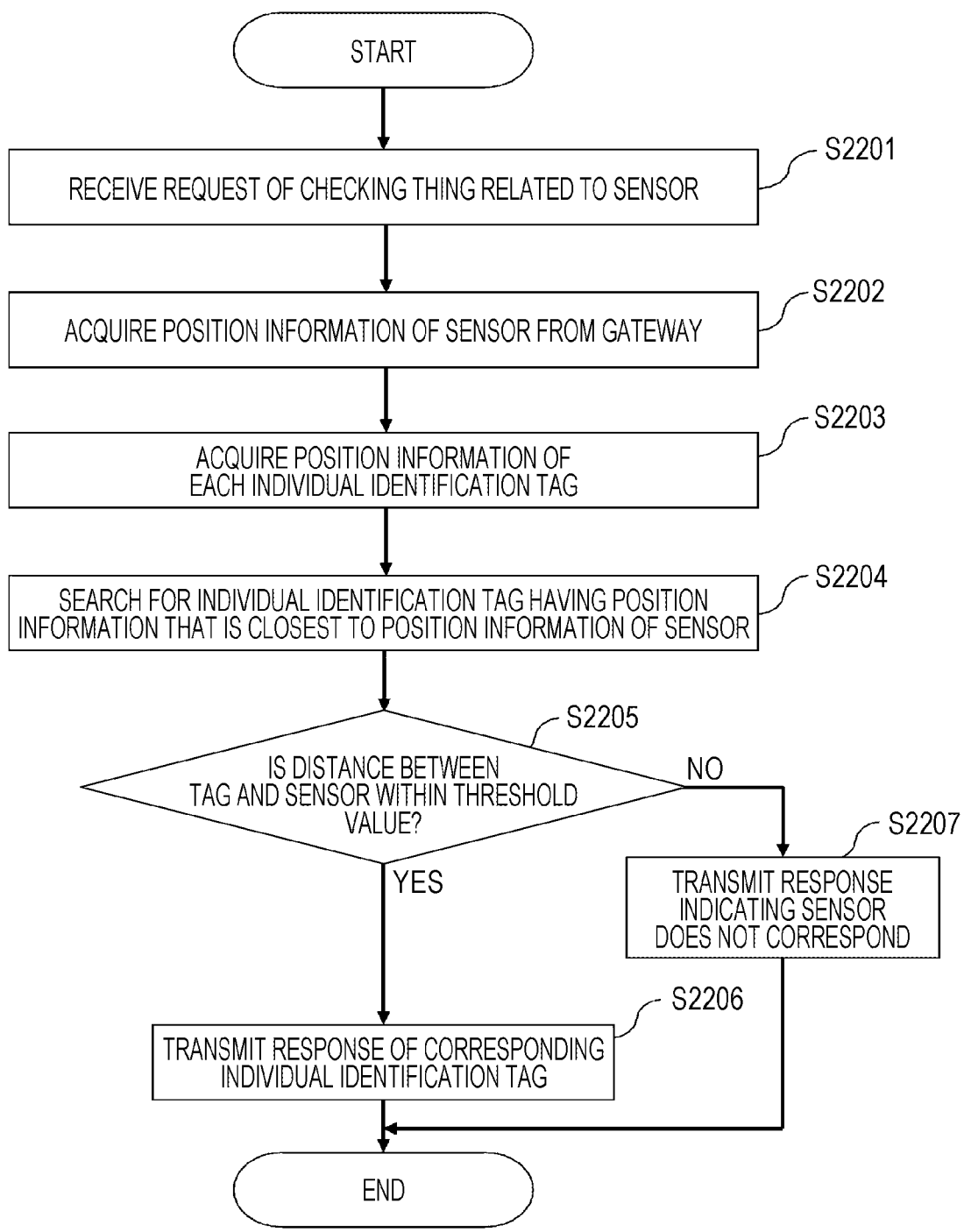
FIG. 22 is a diagram illustrating a flow of specifying processing of the sensor related to the sensing target in a mapping management unit of the device management server in the third embodiment.

FIG. 22 is a flowchart illustrating processing of checking the thing 1601 as the sensing target related to the sensor 1603, in the mapping management unit 1021.

When the mapping management unit 1021 receives a request of checking the thing as the sensing target related to the sensor (S2201), the mapping management unit searches the document 1100 having sensor_id 1110 that coincides with sensor_id included in the checking request, from the device management collection 1011. Then, the mapping management unit requests the position information of the sensor 1603 from url 1120, and acquires the position information of the sensor 1603 from the gateway 107 (S2202).

Then, the mapping management unit requests the position information of the individual identification tag 1602 from url 2120 stored in all documents of the individual identification tag management collection 2001, acquires the position information of all individual identification tags 1602, and uses the acquired position information as the position information of the thing as the sensing target (S2203).

Then, the position information of the sensor 1603 is compared with the position information of all the things 1601 as the sensing target, to specify the thing 1601 as the sensing target, that has the closest distance from the sensor 1603 (S2204).

Then, the mapping management unit checks whether the distance between the sensor 1603 and the thing 1601 as the sensing target is within the predetermined threshold value (S2205). When the distance is within the threshold value, thing_id of the specified thing 1601 as the sensing target is transmitted as a response (S2206). Otherwise, a response indicating that there is no corresponding thing is transmitted (S2207).

The description of the specifying processing of the thing 1601 as the sensing target, that corresponds to the sensor 1603 in the mapping management unit 1021 has been made above.

According to the present embodiment, it is possible to determine the correspondence relationship between the sensing target and the sensor at a sensor starting point. Thus, it is possible to avoid the occurrence that the correspondence relationship between the sensing target and the sensor indicates discrepancy, and to realize an IoT system using the correct sensor data.

Fourth Embodiment

A fourth embodiment of the present invention will be described below with reference to the drawings. The configuration in the fourth embodiment is substantially similar to the configuration of the second embodiment, but the processing in the mapping management unit 1021 of the device management server 105 is different.

Figure 23:
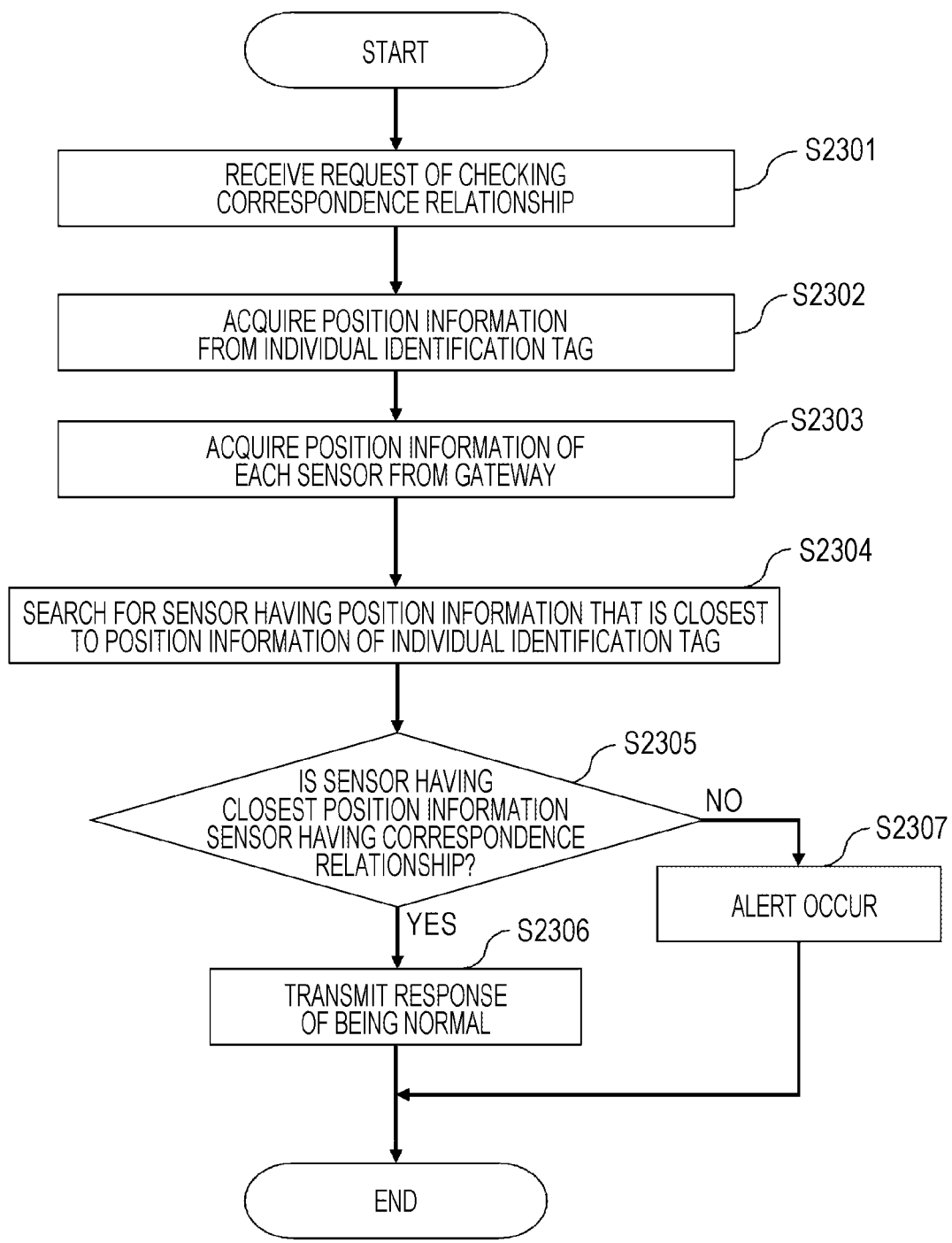
FIG. 23 is a diagram illustrating a flow of correspondence relationship determining processing between the sensing target and the sensor in a mapping management unit of a device management server according to a fourth embodiment.

FIG. 23 is a flowchart illustrating processing of checking the thing 1601 as the sensing target related to the sensor 1603 in the mapping management unit 1021.

When the mapping management unit 1021 receives the request of determining the correspondence relationship (S2301), the mapping management unit acquires the position information of the individual identification tag 1602 included in the checking request, as the position information of the thing as the sensing target (S2302).

Then, the position information of the sensor 1603 is requested from the url 1220 stored in all the documents 1200 of the gateway management collection 1012, and pieces of the position information of all the sensors 1603 are acquired (S2303).

Then, the position information of the thing 1601 as the sensing target is compared with the position information of all the sensors 1603 to specify the sensor 1603 that is closest to the thing 1601 as the sensing target (S2304).

Then, the mapping management unit checks whether the specified sensor 1603 having the closest distance is the sensor as a checking target (S2305). When the sensor is the sensor as the checking target, a response indicating being normal is transmitted (S2306). Otherwise, an alert is issued (S2307).

The description of the processing performed in the mapping management unit 1021 when the correspondence relationship between the thing 1601 as the sensing target and the sensor 1603 is determined has been made above.

According to this embodiment, it is possible to avoid the occurrence that the correspondence relationship between a thing as the sensing target and the sensor indicates discrepancy, and to realize an IoT system using the correct sensor data.

Fifth Embodiment

The configuration in a fifth embodiment is substantially similar to the configuration in the second embodiment, but processing of the sensor information management unit 1722 in the sensing management server 1604 is different.

Figure 24:
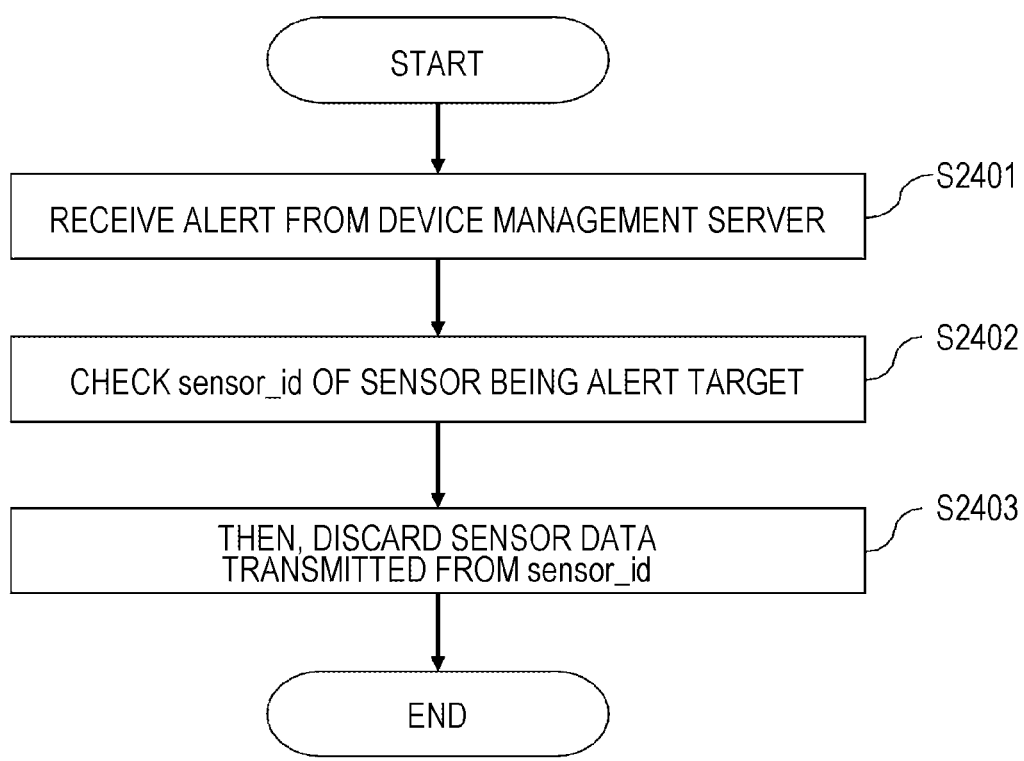
FIG. 24 is a diagram illustrating a configuration of a sensing management server according to a fifth embodiment.

FIG. 24 illustrates the flow of processing of the sensing management server 1604. When the sensor information management unit 1722 in the sensing management server 1604 receives an alert from the device management server 105 (S2401), the sensor information management unit acquires sensor_id of an alert target sensor included in the alert (S2402).

After the alert, the sensor information management unit determines that sensor data transmitted from the sensor is not accurate, and discards the sensor data without storing the sensor data (S2403).

According to the present embodiment, it is possible to avoid contamination of analysis results due to inaccurate sensor data, and to realize an IoT system using only correct sensor data.

Sixth Embodiment

The configuration in a sixth embodiment is substantially similar to the configuration in the second embodiment, but processing of the sensor information management unit 1722 in the sensing management server 1604 is different.

Figure 25:
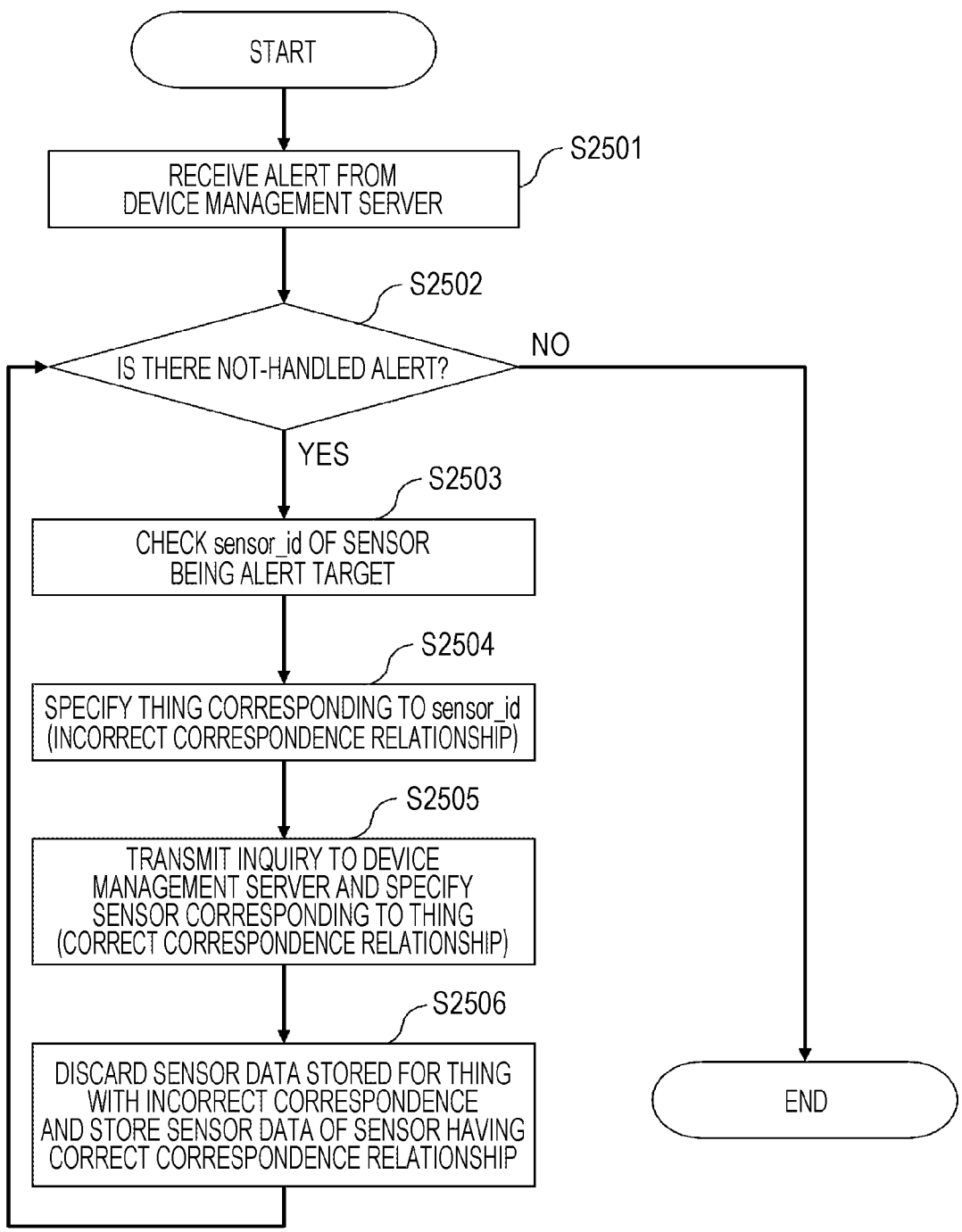
FIG. 25 is a diagram illustrating a configuration of a sensing management server according to a sixth embodiment.

FIG. 25 illustrates the flow of processing of the sensing management server 1604 in the sixth embodiment. When the sensor information management unit 1722 receives an alert from the device management server 105 (S2501), the sensor information management unit determines whether there is not-handled alert, and performs the following processing for each sensor_id included in the alert (S2502).

The sensor information management unit acquires sensor_id of the alert target sensor included in the alert (S2503).

Then, the document 400 in the sensor management collection 1712 (document is illustrated in FIG. 4) is searched for by sensor_id410, and then the thing as the sensing target is specified from the value of mapped_thing 420 in the hit document 400 (the thing having an incorrect correspondence relationship is specified) (S2504).

Then, the sensor information management unit transmits a request of specifying the sensor related to the thing 1601 as the sensing target, to the device management server 105, and grasps the correspondence relationship between thing_id 310 of the thing 1601 (document is illustrated in FIG. 3) as the correct sensing target and sensor_id 410 of the sensor 1603 (S2505).

Then, the sensor information management unit searches for the document 300 in the sensing target management collection 1711 by thing_id 310 of the thing as the sensing target registered incorrectly. Then, the sensor information management unit searches for the content of sensor 340 in the hit document 300 by thing_id 310 of the thing as the correct sensing target and moves the content to sensor 340 in the hit document 300 (S2506).

According to the present embodiment, it is possible to correctly use even sensor data before the discrepancy is noticed, and to realize an IoT system without waste of the sensor data.

What is claimed is:

1. A method for determining a correspondence relationship between a sensing target and a sensor, which is a correspondence relationship determination method for determining whether or not a correspondence relationship between a sensing target and a sensor attached to the sensing target is correct, the method comprising:
   acquiring position information of a first sensor fixed and attached to the sensing target;
   acquiring position information of a second sensor detachably attached to the sensing target; and
   obtaining a distance by comparing the position information of the first sensor and the position information of the second sensor, and determining that a correspondence relationship between the sensing target and the second sensor indicates discrepancy when the distance is equal to or more than a threshold value.

2. The method for determining a correspondence relationship between a sensing target and a sensor according to claim 1, further comprising:

issuing an alert when it is determined that the correspondence relationship between the sensing target and the second sensor indicates discrepancy.

3. The method for determining a correspondence relationship between a sensing target and a sensor according to claim 1, wherein
as the position information of the first or second sensor, position information of a reading terminal that reads sensor data, position information positioned from radio wave intensity during data transmission, or position information of an SIM stored by a mobile line carrier is used.

4. The method for determining a correspondence relationship between a sensing target and a sensor according to claim 1, wherein
determining a correspondence relationship between a sensing target and a sensor by using data reception from a specific sensor as a trigger.

5. The method for determining a correspondence relationship between a sensing target and a sensor according to claim 1, wherein
another sensor having a short distance from the first sensor or the second sensor is searched for, and the correspondence relationship between the sensing target and the sensor is specified.

6. The method for determining a correspondence relationship between a sensing target and a sensor according to claim 1, further comprising:
discarding sensor data when discrepancy occurs in the correspondence relationship between the sensing target and the sensor.

7. The method for determining a correspondence relationship between a sensing target and a sensor according to claim 1, further comprising:
re-registering sensor data registered as sensing data of an incorrect sensing target, as sensing data of a correct sensing target when discrepancy occurs in a correspondence relationship between a sensing target and a sensor.

8. A method for determining a correspondence relationship between a sensing target and a sensor, which is a correspondence relationship determination method for determining whether or not a correspondence relationship between a sensing target and a sensor attached to the sensing target is correct, the method comprising:
acquiring position information of a first sensor fixed and attached to the sensing target;
acquiring position information of a plurality of second sensors detachably attached to a plurality of sensing targets, respectively;
searching for a sensor having position information that is closest to the position information of the first sensor among the plurality of second sensors; and
determining whether or not the sensor having the closest position information is a sensor having a correspondence relationship, determining that a correspondence relationship between the sensing target and one of the second sensors indicates discrepancy when the sensor is not the sensor having the correspondence relationship, and then issuing an alert.

9. A system for determining a correspondence relationship between a sensing target and a sensor, which is a correspondence relationship determination system for determining whether or not a correspondence relationship between a sensing target and a sensor attached to the sensing target is correct, the system comprising:
a first sensor fixed and attached to the sensing target;
a second sensor detachably attached to the sensing target;
a first position information acquisition unit that acquires position information of the first sensor;
a second position information acquisition unit that acquires position information of the second sensor; and
a management device that obtains a distance by comparing the position information of the first sensor and the position information of the second sensor, and determines that a correspondence relationship between the sensing target and the second sensor indicates discrepancy when the distance is equal to or more than a threshold value.

10. The system for determining a correspondence relationship between a sensing target and a sensor according to claim 9, wherein
the management device issues an alert when determining that the correspondence relationship between the sensing target and the second sensor indicates discrepancy.

11. The system for determining a correspondence relationship between a sensing target and a sensor according to claim 9, wherein
as the position information of the first or second sensor, position information of a reading terminal that reads sensor data, position information positioned from radio wave intensity during data transmission, or position information of an SIM stored by a mobile line carrier is used.

12. The system for determining a correspondence relationship between a sensing target and a sensor according to claim 9, wherein
the management device searches for another sensor having a short distance from the first sensor or the second sensor, and specifies the correspondence relationship between the sensing target and the sensor.

13. The system for determining a correspondence relationship between a sensing target and a sensor according to claim 9, wherein
the first sensor is an individual identification sensor, and the second sensor is a status checking sensor.

14. The system for determining a correspondence relationship between a sensing target and a sensor according to claim 9, wherein
the management device discards sensor data when discrepancy occurs in the correspondence relationship between the sensing target and the sensor.

15. The system for determining a correspondence relationship between a sensing target and a sensor according to claim 9, wherein
the management device re-registers sensor data registered as sensing data of an incorrect sensing target, as sensing data of a correct sensing target when discrepancy occurs in the correspondence relationship between the sensing target and the sensor.

* * * * *